(12) United States Patent
Sakurai et al.

(10) Patent No.: US 6,937,226 B2
(45) Date of Patent: Aug. 30, 2005

(54) INPUT DEVICE AND POINTER CONTROL METHOD

(75) Inventors: Satoshi Sakurai, Shinagawa (JP); Nobuo Yatsu, Shinagawa (JP); Michiko Endo, Shinagawa (JP); Yuriko Nishiyama, Shinagawa (JP); Ryoji Kikuchi, Shinagawa (JP); Norio Endo, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 295 days.

(21) Appl. No.: 10/307,958

(22) Filed: Dec. 3, 2002

(65) Prior Publication Data

US 2003/0146899 A1 Aug. 7, 2003

(30) Foreign Application Priority Data

Feb. 6, 2002 (JP) .................................. 2002-030089
Aug. 12, 2002 (JP) .................................. 2002-234543

(51) Int. Cl.$^7$ ............................................. G09G 5/00
(52) U.S. Cl. ..................... 345/156; 345/157; 345/158; 345/159; 345/163; 345/164; 345/165; 345/166
(58) Field of Search ............................... 345/156–159, 345/163–166

(56) References Cited

U.S. PATENT DOCUMENTS

| | | | | |
|---|---|---|---|---|
| 4,896,363 A | * | 1/1990 | Taylor et al. ................ 382/125 |
| 5,109,428 A | * | 4/1992 | Igaki et al. .................. 382/125 |
| 5,943,043 A | * | 8/1999 | Furuhata et al. ............ 345/173 |
| 6,292,173 B1 | * | 9/2001 | Rambaldi et al. ........... 345/157 |
| 6,326,950 B1 | * | 12/2001 | Liu ............................ 345/163 |
| 6,360,004 B1 | * | 3/2002 | Akizuki ...................... 382/124 |
| 6,603,462 B2 | * | 8/2003 | Matusis ....................... 345/173 |
| 2001/0036300 A1 | * | 11/2001 | Xia et al. .................... 382/125 |
| 2002/0122026 A1 | * | 9/2002 | Bergstrom ................... 345/157 |
| 2003/0058084 A1 | * | 3/2003 | O'Hara ........................ 340/5.53 |

FOREIGN PATENT DOCUMENTS

| | | | | |
|---|---|---|---|---|
| GB | 2243235 A | * 10/1991 | ............ G06K/9/20 |
| JP | 4-156434 | 6/1992 | |
| JP | 4-158434 | 6/1992 | |
| JP | 10-275233 | 10/1998 | |
| JP | 11-183026 | 10/1999 | |
| JP | 11-283026 | 10/1999 | |
| JP | 2000057342 A | * 2/2000 | ............ G06T/7/00 |

* cited by examiner

*Primary Examiner*—Richard Hjerpe
*Assistant Examiner*—Alexander S. Beck
(74) *Attorney, Agent, or Firm*—Staas & Halsey LLP

(57) ABSTRACT

An input device that transmits, to a host device having a display displaying a pointer, information relating to the pointer and includes a sensor detecting contact information, and further includes an area extracting part and a control part. The area extracting part extracts a contact area of the sensor and a finger based on the contact information detected by the sensor. The control part controls the pointer based on the contact area extracted by the area extracting part.

14 Claims, 43 Drawing Sheets

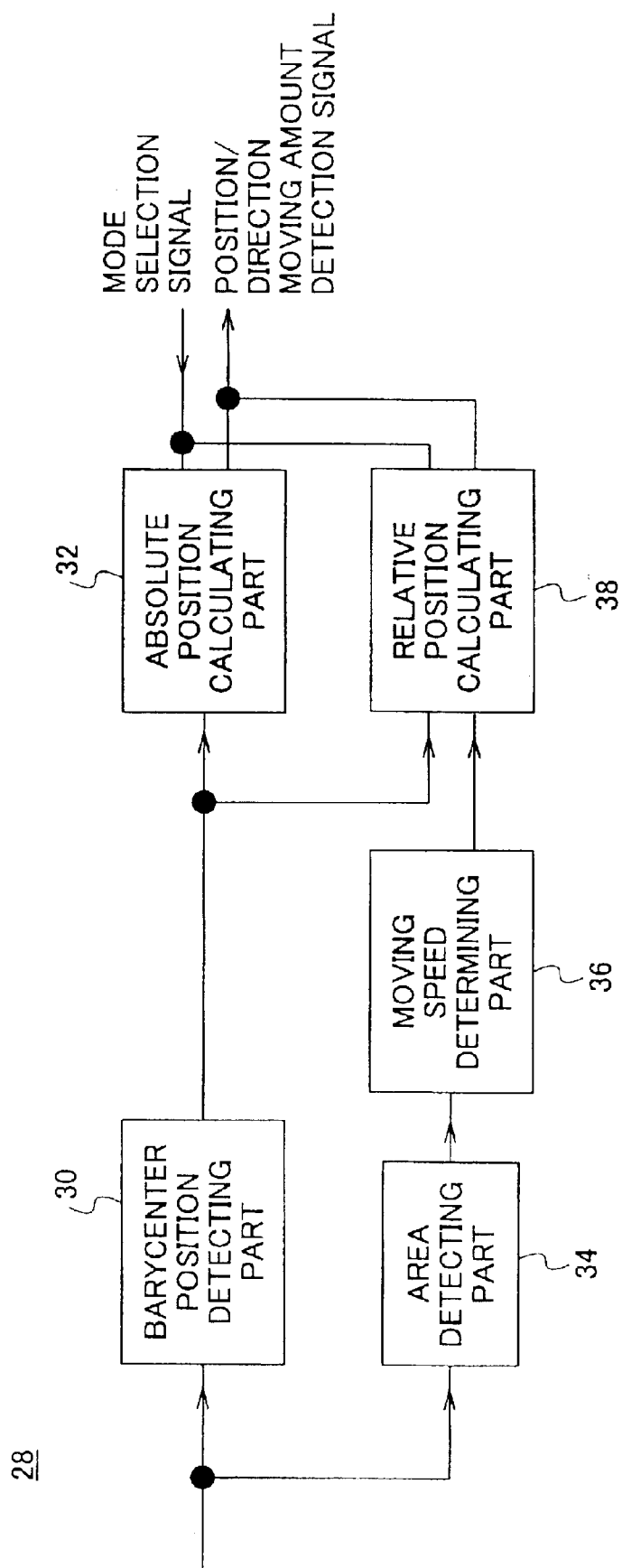

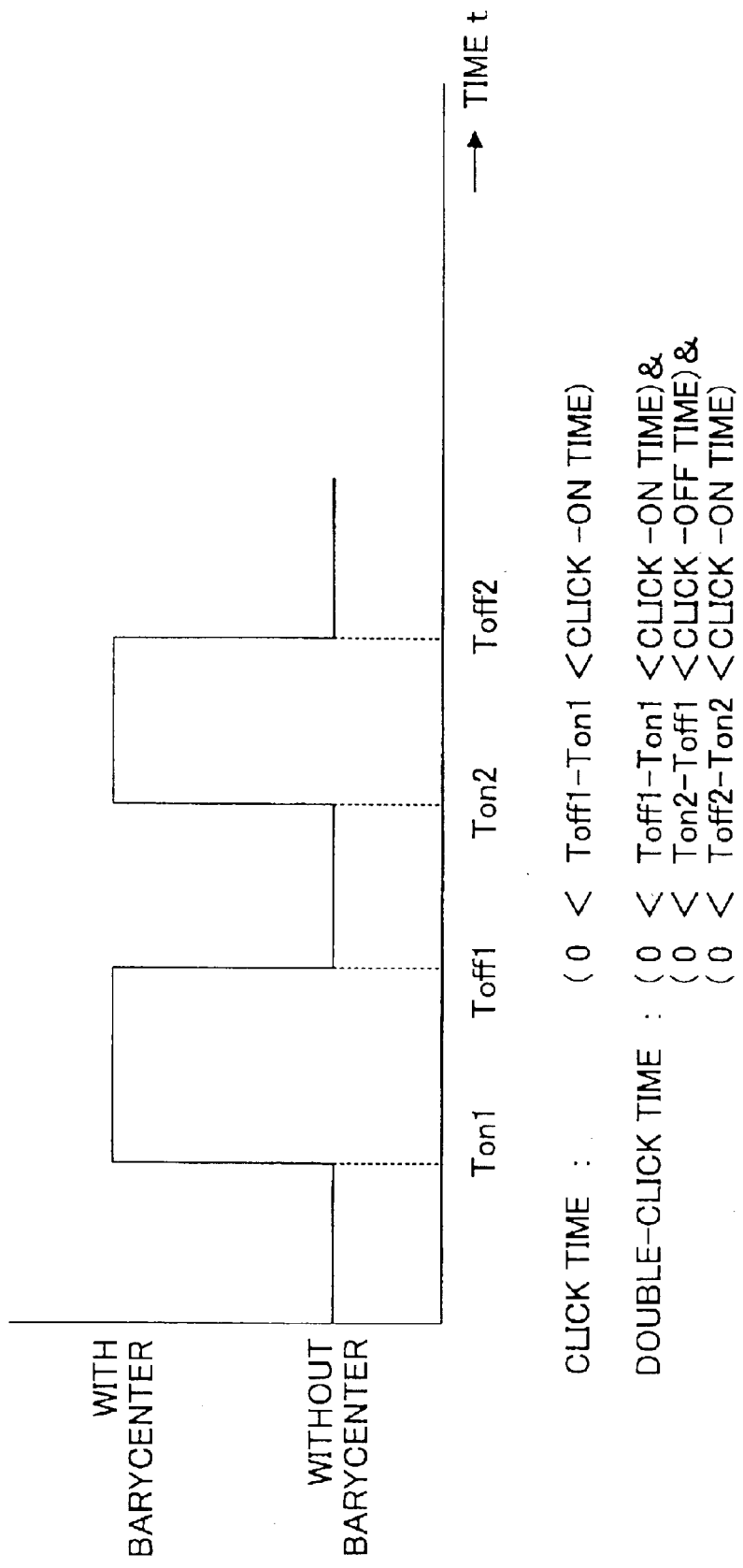

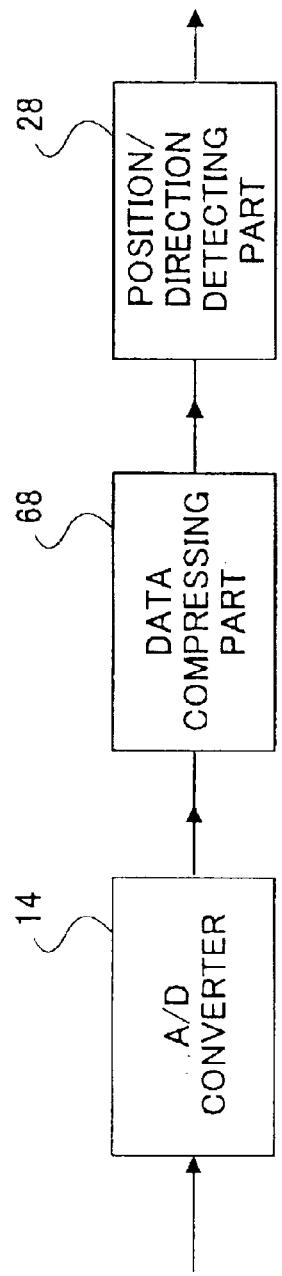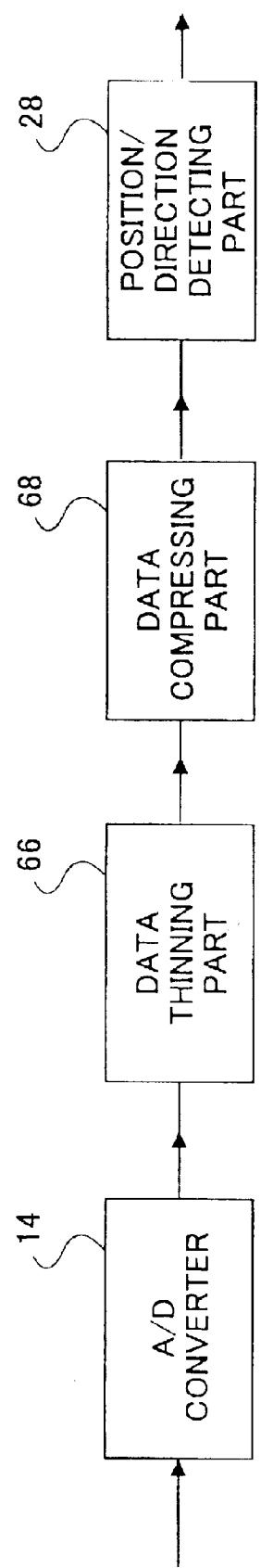

FIG.41

| FINGERPRINT AUTHENTICATION DATA 1 |
| --- |
| LOWEST SPEED SP1 |
| FINGERPRINT AREA VALUE Fn1 AT LOWEST SPEED SP1 |
| HIGHEST SPEED SP2 |
| FINGERPRINT AREA VALUE Fn2 AT HIGHEST SPEED SP2 |
| FINGERPRINT AUTHENTICATION DATA 2 |
| LOWEST SPEED SP1 |
| FINGERPRINT AREA VALUE Fn1 AT LOWEST SPEED SP1 |
| HIGHEST SPEED SP2 |
| FINGERPRINT AREA VALUE Fn2 AT HIGHEST SPEED SP2 |
| ... |
| FINGERPRINT AUTHENTICATION DATA n |
| LOWEST SPEED SP1 |
| FINGERPRINT AREA VALUE Fn1 AT LOWEST SPEED SP1 |
| HIGHEST SPEED SP2 |
| FINGERPRINT AREA VALUE Fn2 AT HIGHEST SPEED SP2 | ial
INPUT DEVICE AND POINTER CONTROL METHOD

BACKGROUND OF THE INVENTION

1. Field of the Invention

The present invention relates to input devices having a fingerprint reading sensor, and more particularly to an input device having a pointing device function and to a pointer control method.

2. Description of the Related Art

Conventionally, a device provided with various functions including fingerprint recognition has been proposed. For example, in Japanese Laid-Open Patent Application No. 11-283026, the touch pad having a finger reading function and an information processing apparatus are disclosed. In this application, a description is given of a case where a sensor for detecting a fingerprint and a position sensor for detecting the position which a finger touches, which conventionally are provided in separate units, are provided in a single unit, and position data in the vicinity of the center of the finger touching the sensor is sent as coordinate information to a computer. Also, Japanese Laid-Open Patent Application No. 4-158434 discloses a pointing device of a display apparatus. This application discloses the invention of moving a cursor on a display based on the moving direction and moving distance of a finger that are obtained by fiber print patterns detected at regular time intervals. In addition, Japanese Laid-Open Patent Application No. 10-275233 discloses an information processing system, pointing device and information processing apparatus. The application gives a description of the invention of determining the moving position of a pointer based on the difference between a fingerprint image and a verified image detected by using Fourier transformation.

As described above, in the conventional input device, the pointer on the display is controlled by detecting the difference of the movement of the finger.

However, in the method of detecting the movement of the finger, there is a disadvantage in the operability since the finger must be actually moved, and at the same time, a larger device is required since a sensing part is required, resulting in cost increase.

SUMMARY OF THE INVENTION

It is a general object of the present invention to provide an improved and useful input device and a pointer control method in which the above-mentioned problems are eliminated.

It is another and more specific object of the present invention to provide an input device and a control method that can control a pointer without actually moving a finger and detect a click operation.

In order to achieve the above-mentioned objects, according to one aspect of the present invention, there is provided an input device that transmits, to a host device having a display displaying a pointer, information relating to the pointer and includes a sensor detecting contact information including: an area extracting part extracting a contact area of the sensor and a finger based on the contact information detected by the sensor; and a control part controlling the pointer based on the contact area extracted by the area extracting part.

According to the present invention, an input device that extracts the contact area by the area extracting part extracting the contact area and controls the pointer using the contact area of the finger and the sensor is provided.

Also, the input device may include a first control part that detects the position of the barycenter of the contact area or the position of the center of the contact area, and controls the pointer by using the detected position.

In addition, the input device may include a click detecting part that detects a click based on a detected time by using the condition that the barycenter or center cannot be detected when the finger is not touching the sensor. It should be noted that the click refers to an operation of pressing a sensor surface (sensor part) once.

Further, the input device may include a second control part that detects, from the contact area, the area (size) thereof, the length of the outline thereof, and the length of the sides of a rectangle circumscribing the contact area. By the second control part, it is also possible to determine the moving speed of the pointer based on the detected amount (the area, the length of the outline, and the length of the sides). Moreover, it is also possible to detect the click operation according to the detected amount and further to detect the movement of the finger in a direction almost perpendicular to the contact area.

The information (contact area information) of the contact area used as mentioned above may be reduced or compressed with respect to predetermined information. Thus, it is possible to improve the processing speed.

In addition to the above-described functions as a pointing device, as a fingerprint identification function, the input device according to the present invention may include fingerprint dictionary information that records fingerprint information beforehand. Thus, it is possible to identify the fingerprint by using the fingerprint dictionary information. Further, it is possible to record a plurality of fingerprints in the fingerprint dictionary information, for example, the first and second fingers of one hand for each user. By recording the plurality of fingerprints, it is possible to automatically switch several operation modes of the input device.

According to the present invention, it is possible to provide an input device and a pointer control method that can control the pointer without actually moving the finger and detect the click operation.

Other objects, features and advantages of the present invention will become more apparent from the following detailed description when read in conjunction with the following drawings.

BRIEF DESCRIPTION OF THE DRAWINGS

FIG. 8 is a block diagram showing a position/direction detecting part in a barycenter pattern;

FIG. 17 is an explanatory diagram of a click determination method;

FIG. 29 is an X-Y coordinate graph showing a data thinning method;

FIG. 34 is a block diagram showing the arrangement position of a data compressing part;

FIG. 35 is a block diagram showing the arrangement position of the data thinning part and the data compressing part;

FIG. 41 is a schematic diagram showing fingerprint dictionary data;

DETAILED DESCRIPTION OF THE PREFERRED EMBODIMENTS

Figure 1:
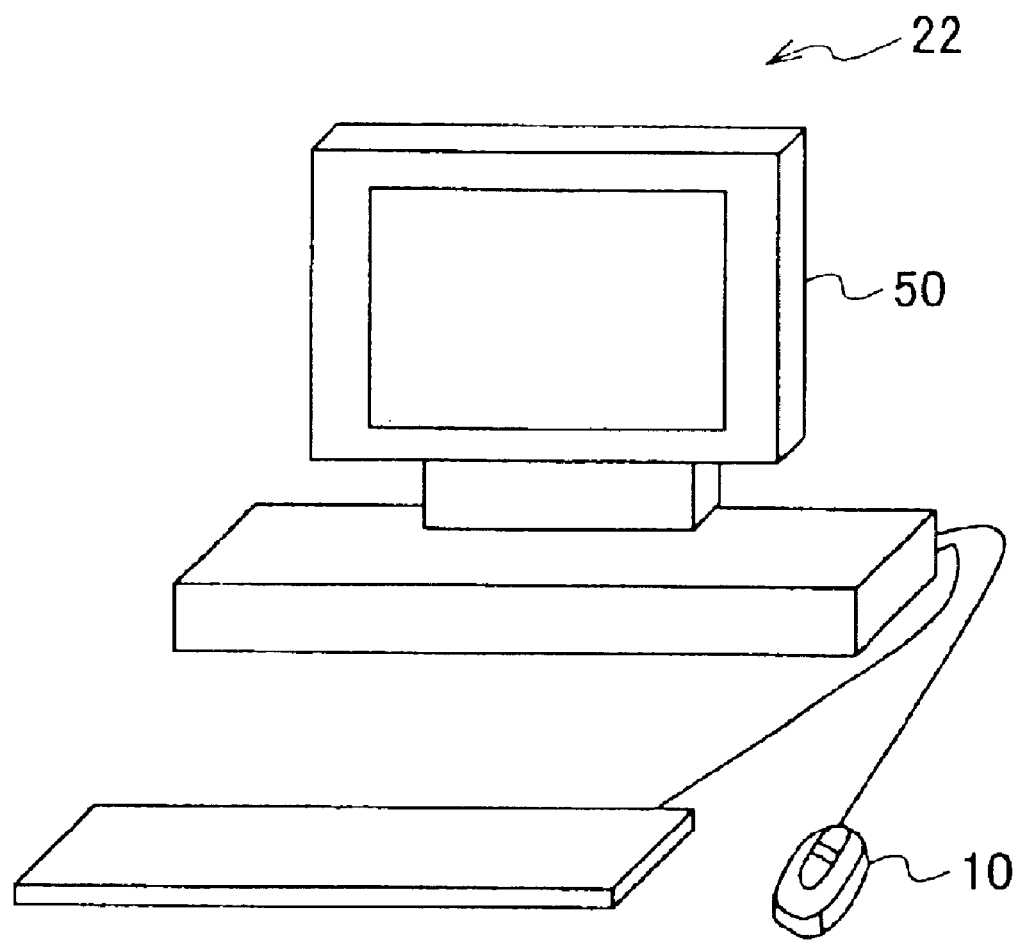
FIG. 1 is a schematic diagram showing the entire structure of a system according to embodiments of the present invention.

A description will be given of embodiments of the present invention, by referring to the drawings.

FIG. 1 is a diagram showing the entire structure of a system according to embodiments of the present invention. As shown in FIG. 1, an input device 10 is connected to a computer 22 via such as a USB (Universal Serial Bus) cable and transmits, to the computer 22, data of such as the position of a pointer detected for displaying on the computer 22.

Figure 2:
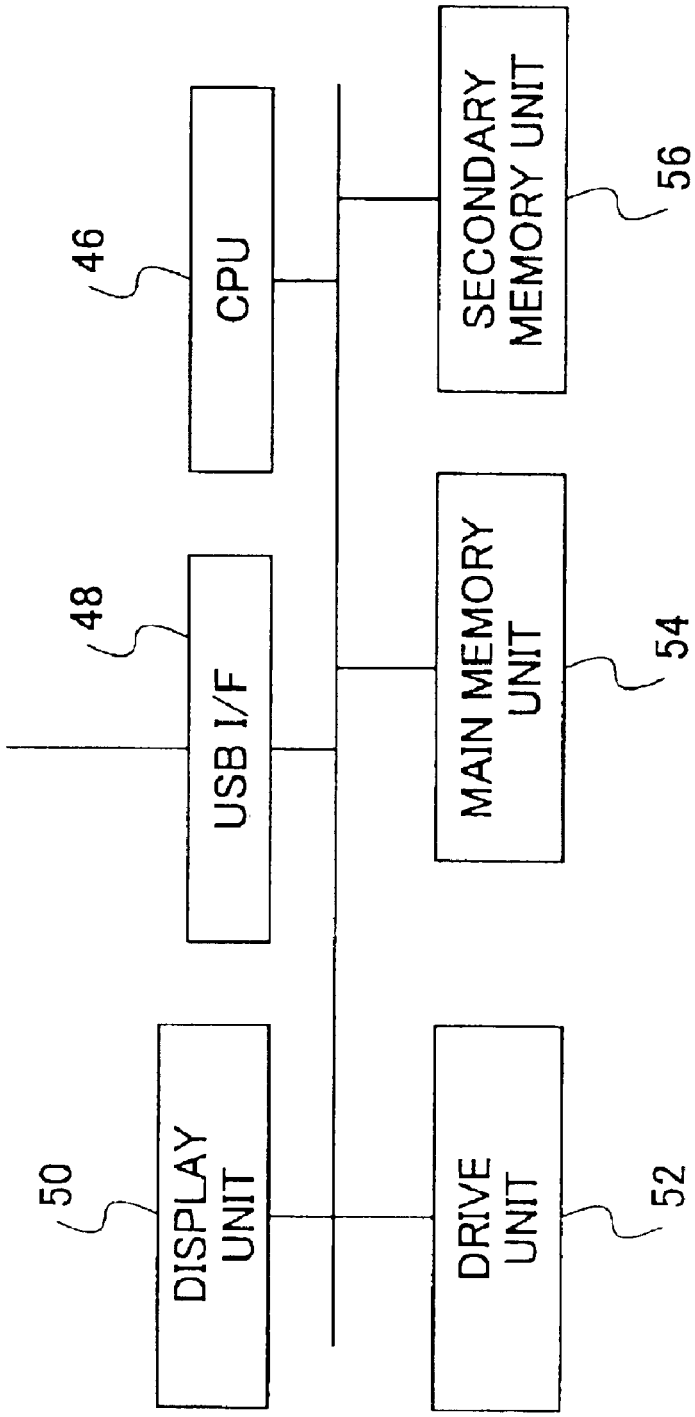
FIG. 2 is a hardware block diagram of the computer shown in FIG. 1.

As shown in FIG. 2, the computer 22 includes a display unit 50, a drive unit 52, a main memory unit 54, a secondary memory unit 56, a CPU (Central Processing Unit) 46, and a USB (Universal Serial Bus) interface 48 that are connected via a bus. The display unit 50 displays various sets of information required for operating the computer 22. The drive unit 52 can read from and write to a detachable recording medium and is used when reading a program from the recording medium and installing the program in the secondary memory 56, for example. The CPU 46 reads and carries out the program stored in the secondary memory unit 56 and uses the main memory unit 54 for storing the program and data. The USB interface 48 is an interface for transmitting to and receiving from the input device 10 by the USB transmission mode.

Figure 3:
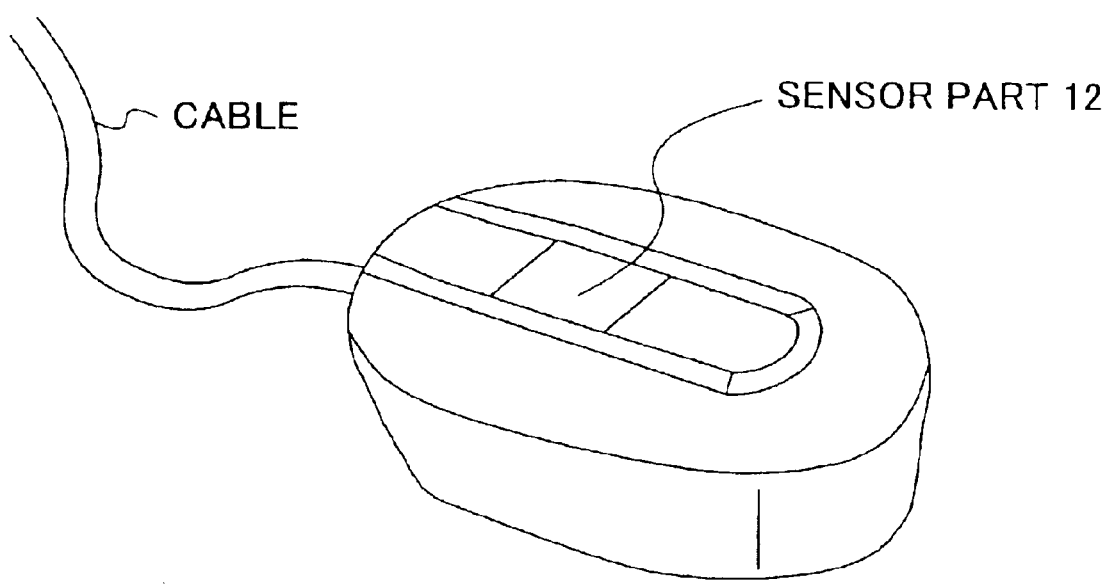
FIG. 3 is a perspective view of the input device shown in FIG. 1.

FIG. 3 is a perspective view of the input device 10. As shown in FIG. 3, the input device 10 is formed in a shape to be used with a hand thereon and includes a sensor part 12 that detects a fingerprint, for example.

Figure 4:
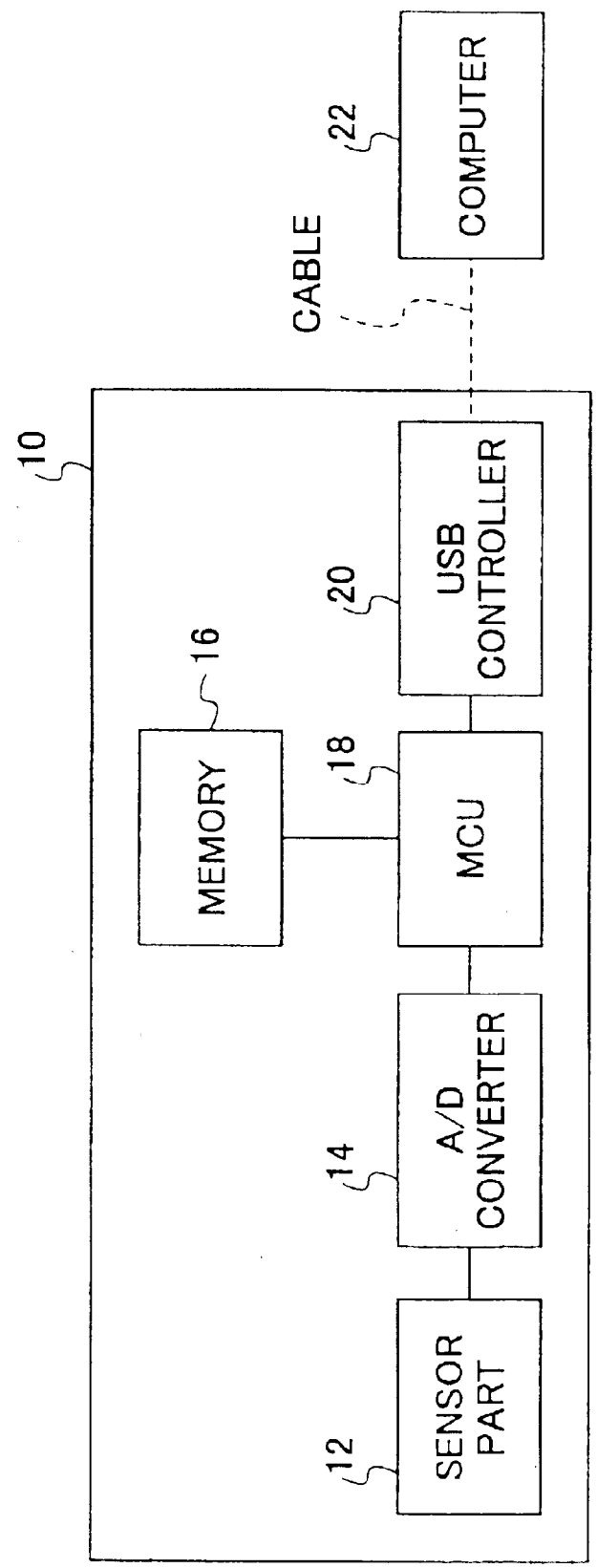
FIG. 4 is a hardware block diagram of the input device.

FIG. 4 is a hardware block diagram of the input device 10. As shown in FIG. 4, the input device 10 includes the sensor part 12, an A/D converter 14, an MCU (Micro Computer Unit) 18, a memory 16, and a USB controller 20. The sensor part 12 performs such as the above-mentioned detection of a fingerprint and detection of a part of the sensor part 12 where a finger touches. Then, the detected signal is output to the A/D converter 14, undergoes A/D conversion by the A/D converter 14, and is output to the MCU 18. The MCU 18 processes data from the sensor part 12 and outputs the processed data to the computer 22 via the USB controller 20. In addition, the memory 16 is used for temporarily maintaining a program to perform a process and data.

Figure 5:
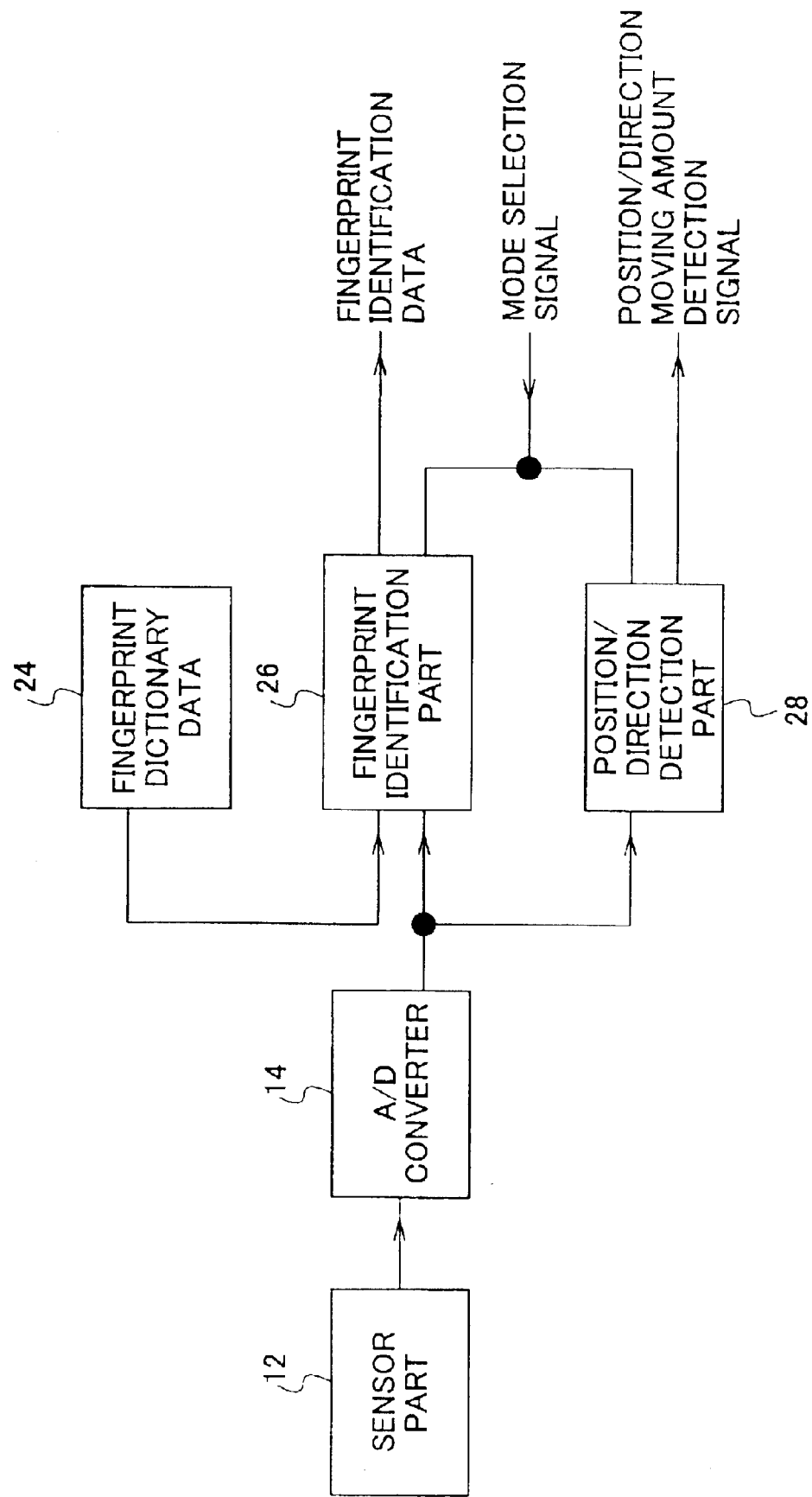
FIG. 5 is a function block diagram of the input device.

Next, a description will be given of the function of the input device 10, with reference to FIG. 5. FIG. 5 shows the above-described sensor part 12 and A/D converter 14, fingerprint dictionary data 24, fingerprint identification part 26, and a position/direction detecting part 28. The fingerprint identification part 26 compares the fingerprint data recognized from contact information detected by the sensor part 12 with the fingerprint dictionary data 24 recording fingerprints that are registered beforehand. Then, the fingerprint identification part 26 outputs fingerprint identification data that are information indicating the fingerprint pattern in the fingerprint dictionary data 24 matching the recognized fingerprint data or indicating that no matching fingerprint is found. The position/direction detecting part 28 detects the position where the finger is put of the sensor part 12 based on the fingerprint data on which A/D conversion is performed, and outputs the detected position as a position/direction moving amount detection signal (position/direction detecting process).

Figure 6:
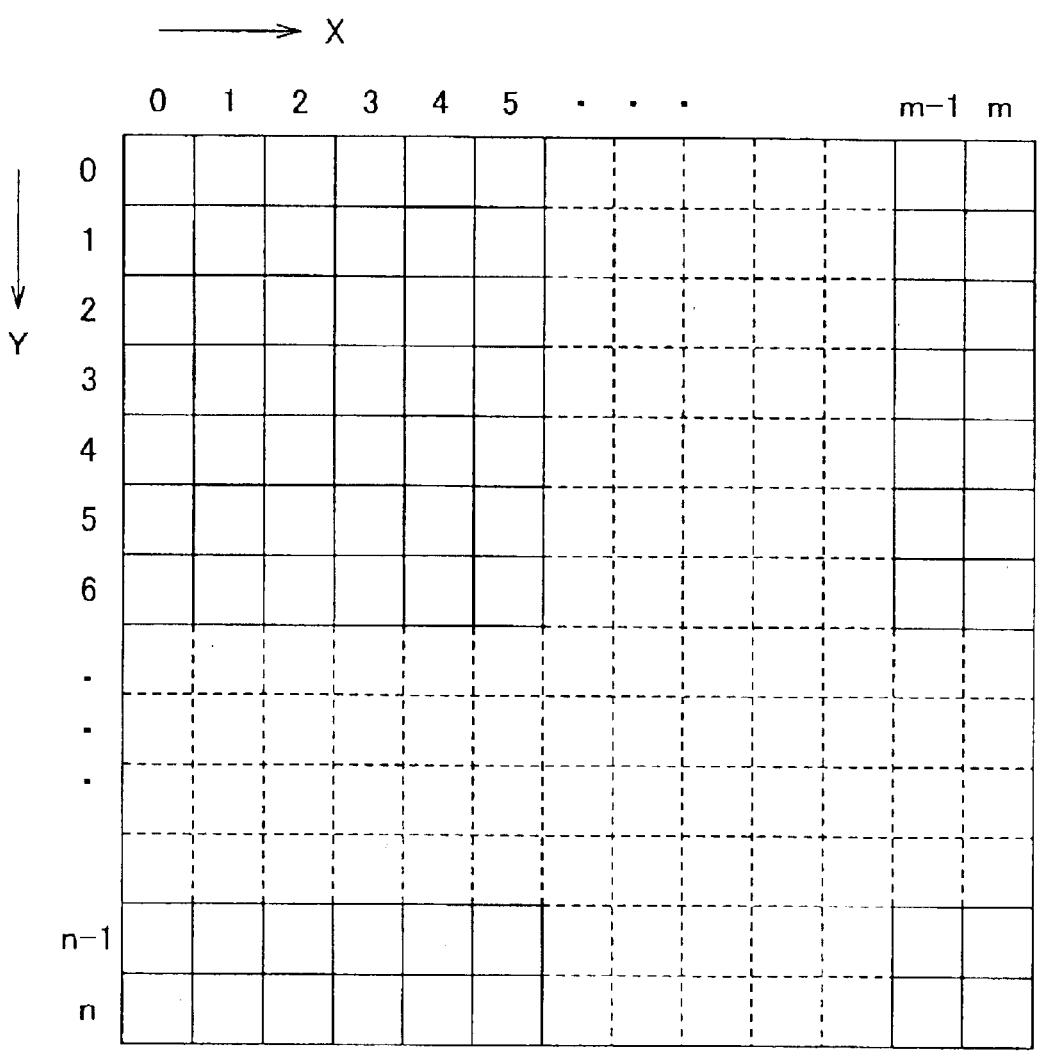
FIG. 6 is an X-Y coordinate graph.

Next, a description will be given of the above-mentioned sensor part 12 and A/D converter 14. First, the sensor part 12 scans the sensor surface and detects the contact information of the finger by analog data. The A/D converter 14 converts the analog data detected by the sensor part 12 into digital data. The fingerprint information on which the digital conversion is performed is output as contact information using boxes obtained by dividing the part where the finger touches as shown in FIG. 6 into n×m boxes. The position of the box can be indicated as box (X, Y) using X-Y coordinate as shown in FIG. 6.

Figure 7:
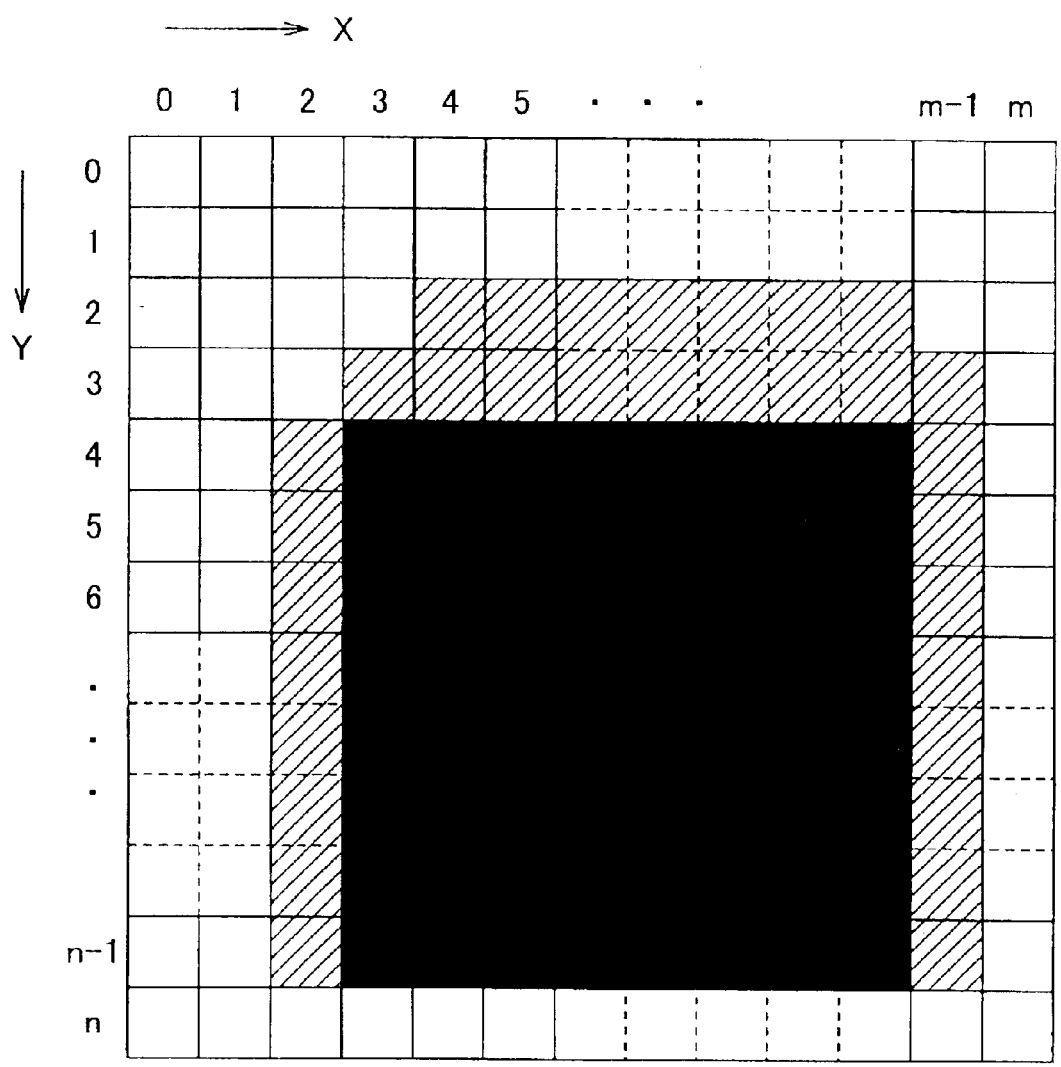
FIG. 7 is an X-Y coordinate graph on which contact information is output.

A description will be given of an example of the contact information, by referring to FIG. 7. When the finger touches the sensor part 12, as shown in FIG. 7, the boxes (X, Y) of the part where the finger is touching and the strength at which the finger is touching the boxes (X, Y) are detected. For instance, the part that is touched strongly are output with a dark color as the box (4, 5), and the parts that are touched weakly are output with a pale color as the box (4, 2).

A description will be given of the position/direction detecting part 28. The position/direction detecting part 28 has the function of detecting, from the contact area (fingerprint pattern) obtained from the contact information, the position/direction moving amount that is the absolute coordinate value on the display unit 50. There are two kinds of patterns of the position/direction detecting part 28 depending on the combination of data used for detecting the absolute coordinate value. In the following, the two patterns will be explained in order.

Figure 9A:
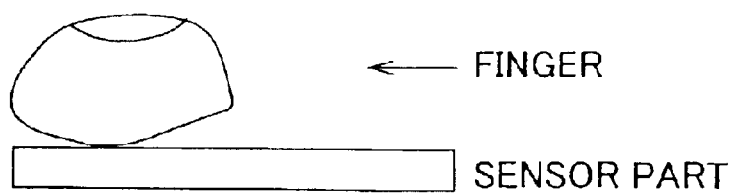
FIG. 9A is a partial side elevation view of a finger and a sensor part when the finger is placed on the sensor part lightly.
Figure 9B:
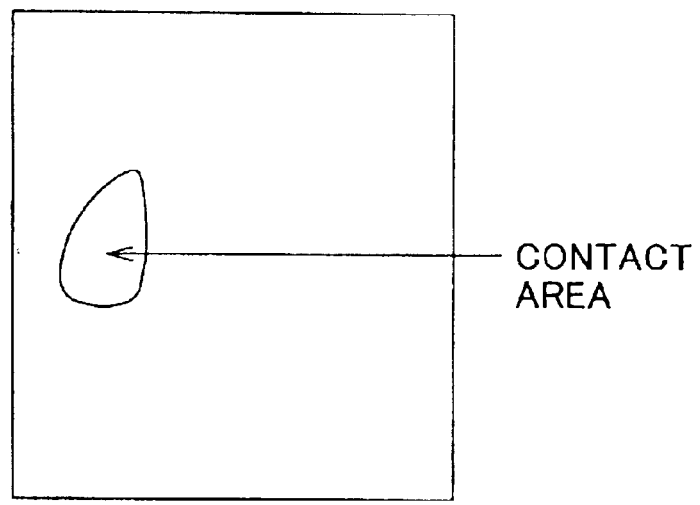
FIG. 9B is a bottom view showing a contact area of the sensor part when the finger is placed on the sensor part lightly.
Figure 10A:
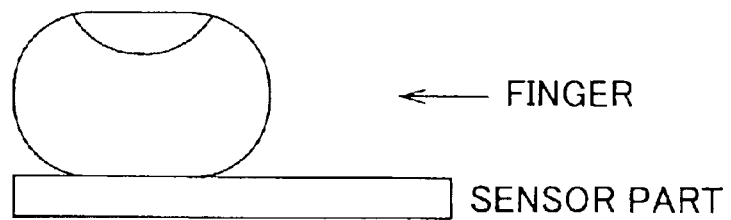
FIG. 10A is a side elevation view of the finger and the sensor part when the finger is pushed against the sensor part.
Figure 10B:
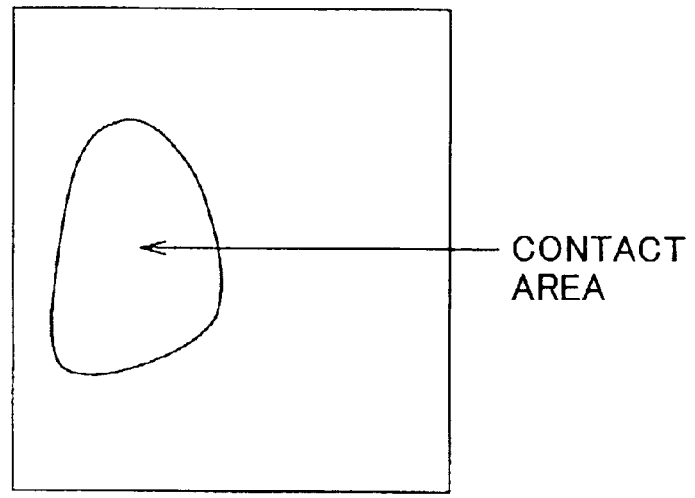
FIG. 10B is a bottom view showing the contact area of the sensor part when the finger is pushed against the sensor part.

First, a description will be given of a barycenter pattern using the barycenter of the contact area (fingerprint pattern), with reference to FIG. 8. FIG. 8 shows particulars about the position/direction detecting part 28 in detail. In FIG. 8, a barycenter position detecting part 30, an area detecting part 34, an absolute position calculating part 32, a relative position calculating part 38, and a moving speed determining part 36 are shown. The barycenter position detecting part 30 detects the position (fingerprint barycenter position) of the barycenter of the contact area that is the part where the finger is touching in above-described FIG. 7. The area detecting part 34 detects the area of the contact area. The absolute position calculating part 32 obtains the absolute coordinate position on the display of the display unit 50 of the computer 22, based on the information from the barycenter detecting part 30, and outputs the obtained position as the direction/position moving amount detection signal. More specifically, when the barycenter of the finger touching the sensor part 12 is in the upper side of the sensor part 12, the pointer on the display of the display unit 50 is displayed in the upper side. In addition to the function of the absolute position calculating part 32, the relative position calculating part 38 can vary the moving speed of the pointer. The relative position calculating part 38 moves the pointer to a target position at a speed determined by the moving speed determining part 36 that will be described later. The moving speed determining part 36 that determines the moving speed determines the speed of screen scrolling and the cursor movement on the window of the display unit 50, according to the area detected by the area detecting part 34. For example, as shown in FIGS. 9A and 9B, when the contact area is small, the movement of the cursor is slowed, and when the contact area is large as shown in FIGS. 10A and 10B, the movement of the cursor is quickened.

Next, a description will be given of the processes of the area detecting part 34 and the barycenter position detecting part 30, in the order of the detection of the area and the determination of the barycenter. First, in above-mentioned FIG. 7, there are boxes having the dark color and boxes having the pale color, and the shading value of the box (i, j) is defined as $P_{ij}$. Secondly, a threshold value C of the shading value for determining whether or not the box having the shading value $P_{ij}$ is in the contact area or a non-contact area is prepared. Then, a variable $d_{ij}$ of which value is 1 when the box (i, j) is in the contact area and 0 when the box (i, j) is in the non-contact area is defined as follows.

$$d_{ij} = \begin{cases} 1 & (P_{ij} \geq C) \\ 0 & (P_{ij} < C) \end{cases} \quad \text{(Formula 1)}$$

$d_{ij}$ of the Formula 1 is the identification result of whether the box is in the contact area or the non-contact area. At the same time, paying attention to the fact that the area of each of the boxes is 1, the total area of the boxes determined to be included in the contact area, that is, an area (size) S of the contact area is as follows.

$$S = \sum_{j=0}^{n} \sum_{i=0}^{m} d_{ij} \quad \text{(Formula 2)}$$

As described above, the area detecting part 34 obtains the area S of the contact area. Then, projection values $Tx_1$ and $Ty_1$ are obtained for the X-axis and Y-axis, respectively, so as to obtain the barycenter by using the area S. The definitional formulas of the projection values $Tx_1$ and $Ty_1$ are represented by Formulas 3 and 4, respectively.

$$Tx_i = \sum_{j=0}^{n} P_{ij} \ (P_{ij} \geq C) \quad \text{(Formula 3)}$$

$$Ty_i = \sum_{i=0}^{m} P_{ij} \ (P_{ij} \geq C) \quad \text{(Formula 4)}$$

Since the right sides of these equations are the sums of $P_{ij}$ that are determined as the contact area, Formula 3 represents the sum of the areas of the boxes of which X coordinate is i, and Formula 4 represents the sum of the areas of the boxes of which Y coordinate is j. Additionally, in Formulas 3 and 4, there are m projection values $Tx_1$ and n projection values $Ty_1$. The box corresponding to the barycenter position is defined by Formula 5 from the obtained projection values $Tx_1$ and $Ty_1$.

$$\left(\frac{1}{S}\sum_{i=0}^{m}(\alpha_i Tx_i), \frac{1}{S}\sum_{j=0}^{n}(\beta_j Ty_j)\right) \qquad \text{(Formula 5)}$$

Here, $\alpha_1$ and $\beta_j$ are coefficients and sequences defined as $\alpha_1=i$ and $\beta_j=j$, for example. In addition, the above X coordinate and Y coordinate are weighted averages respectively obtained by dividing each of the sums of the $\alpha_i$ times projection value $Tx_1$ and $\beta_j$ times projection value $Ty_i$ by the area S.

Figure 11:
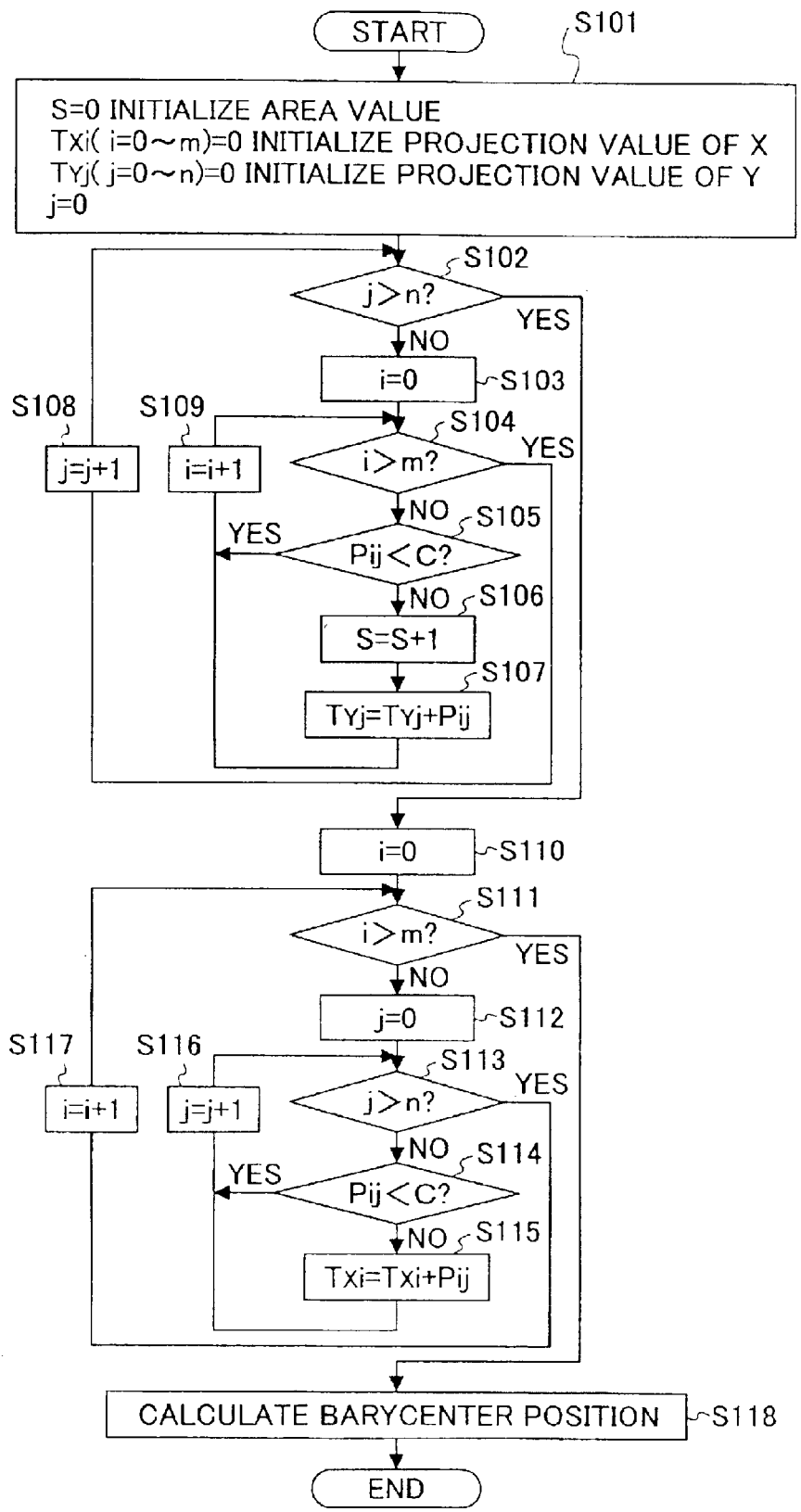
FIG. 11 is a flow chart for explaining a process of obtaining a barycenter.

Referring to the flow chart of FIG. 11, the above-described process of obtaining the barycenter will be explained. The process of the flow chart includes two process blocks. One is a process of obtaining the area S and projection value $Ty_j$. In this process, S and $Ty_j$ are obtained simultaneously so as to make the process more efficient. The other is a process of obtaining the projection value $Tx_1$. The process of obtaining the area S and projection value $Ty_1$ corresponds to steps S101 through S109, and the process of obtaining the projection value $Tx_i$ corresponds to steps S110 through S118.

A description will be given of the flow chart. In the first step S101, the value of the area S, the projection value X, the projection value Y and a loop counter j are initialized. Next, in step S102, it is determined whether or not the loop counter j exceeds n. The loop counter j is the counter counting the number of the boxes arranged in the Y-axis direction. Thus, when j exceeds n that is the number of the boxes arranged in the Y-axis direction, the process of obtaining $Ty_j$ and S is finished, and the process proceeds to the next block, which will be described later, where the projection value $Tx_1$ is obtained. When j is equal to or less than n in step S102 (NO in step S102), the process proceeds to step S103 since the process of obtaining $Ty_j$ and S is continued. In step S103, initialization of a loop counter i is performed. The loop counter i is a counter counting the number of the boxes arranged in the X-axis direction. In step S104, as is the case with j, whether or not i exceeds m is determined. In a case where i exceeds m that is the number of the boxes arranged in the X-axis direction (YES in step S104), the case indicates that the process relating to the boxes of which Y-coordinate is j ends. Thus, the process proceeds to step S108 so as to perform the process of "j+1"th boxes. When i is equal to or less than m (NO in step S104), in step S105, whether or not the shading value $P_{ij}$ is smaller than the threshold value C is determined. When $P_{ij}$ is smaller than C (YES in step S105), since the box (i, j) is not in the contact area (fingerprint pattern), no process is performed, and the process proceeds to step S109 so as to performs the process of "i+1"th box. When $P_{ij}$ is equal to or larger than C (NO in step S105), the box (i, j) is in the contact area. Accordingly, the processes of obtaining the area S and the projection value $Ty_j$, which are the objects of the process block, are performed in steps S106 and S107, respectively. Step S106 is the process of obtaining the area S. In step S106, the area 1 of the box is added to the area S. In addition, step S107 is the process of obtaining the projection value $Ty_j$. Thus, in step S107, $P_{ij}$ is added to $Ty_j$ (refer to Formula 4). When the above-described process ends, the process proceeds to step S109 so as to perform the process of "i+1"th box. When the area S and the projection value Y are obtained in this manner, the process branches off to step S110 at step S102, and the process block of obtaining the projection value X is performed.

In the process block of obtaining the projection value X, as shown in the Formula 3, the process of obtaining the sum of $P_{ij}$ relating to i is performed by fixing i. When $Tx_1$ is obtained, the sum is obtained again by incrementing i. This process is repeated until the condition i>m is satisfied. Therefore, first, in step S110, the loop counter i is initialized again. Next, in step S111, whether or not i exceeds m is determined. The loop counter i is the counter for counting the number of the boxes arranged in the X-axis direction. Thus, when i exceeds m that is the number of the boxes arranged in the X-axis direction (YES in step S111), the projection value X is obtained. In the first process block, the projection value Y and the area S are obtained. Accordingly, the barycenter position is obtained in step S118 (refer to Formula 5). In step S112, initialization of the loop counter j is performed. The loop counter j is a counter counting the number of the boxes arranged in the Y-axis direction. Similar to i, it is determined whether or not j exceeds n in step S113. Then, as in the case with i, when j exceeds n that is the number of the boxes arranged in the Y-axis direction (YES in step S113), the process of the "i"th boxes in the Y-axis direction is finished. Thus, the process proceeds to step S117 so as to perform the process of "i+1"th boxes. When j is equal to or less than n in step S113 (NO in step S113), in the next step S114, the above-described comparison between the shading value $P_{ij}$ and the threshold value C is performed. When $P_{ij}$ is smaller than C (YES in step S114), since the box (i, j) is the non-contact area, no process is performed and the process proceeds to step S116 for performing the process of "j+1"th boxes. When $P_{ij}$ is equal to or larger than C (NO in step S114), since the box (i, j) is the contact area, $P_{ij}$ is added to $Tx_i$ in step S115 so as to obtain the projection value $Tx_1$ that is the object of the process block (refer to Formula 3). When the projection value X is obtained in this manner, the process branches off to step S118 at step S111, the barycenter position is calculated in step S118, and thus the barycenter is obtained.

Figure 12:
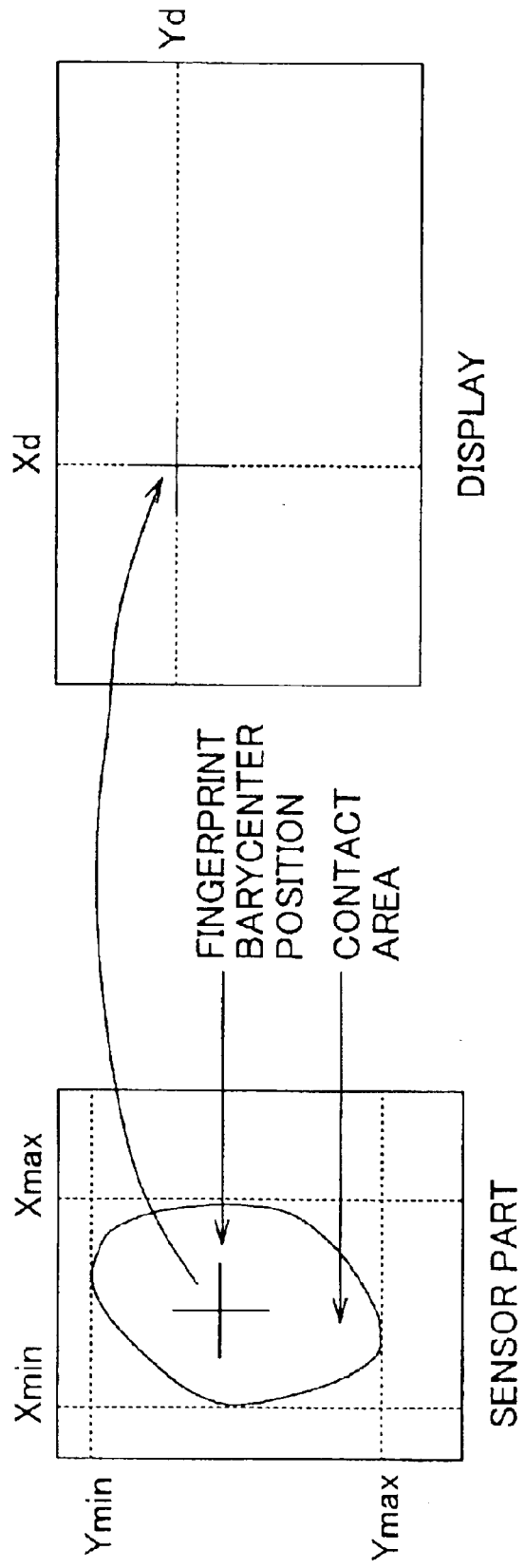
FIG. 12 is a schematic diagram showing the correspondence between a barycenter position of the contact area and a display position on a display.

As mentioned above, in the barycenter pattern, the coordinate position is detected by obtaining the barycenter position of the contact area. The thus detected coordinate position is, as shown in FIG. 12, reflected in the display of the display unit 50 (in this case, (Xd, Yd)).

Figure 13:
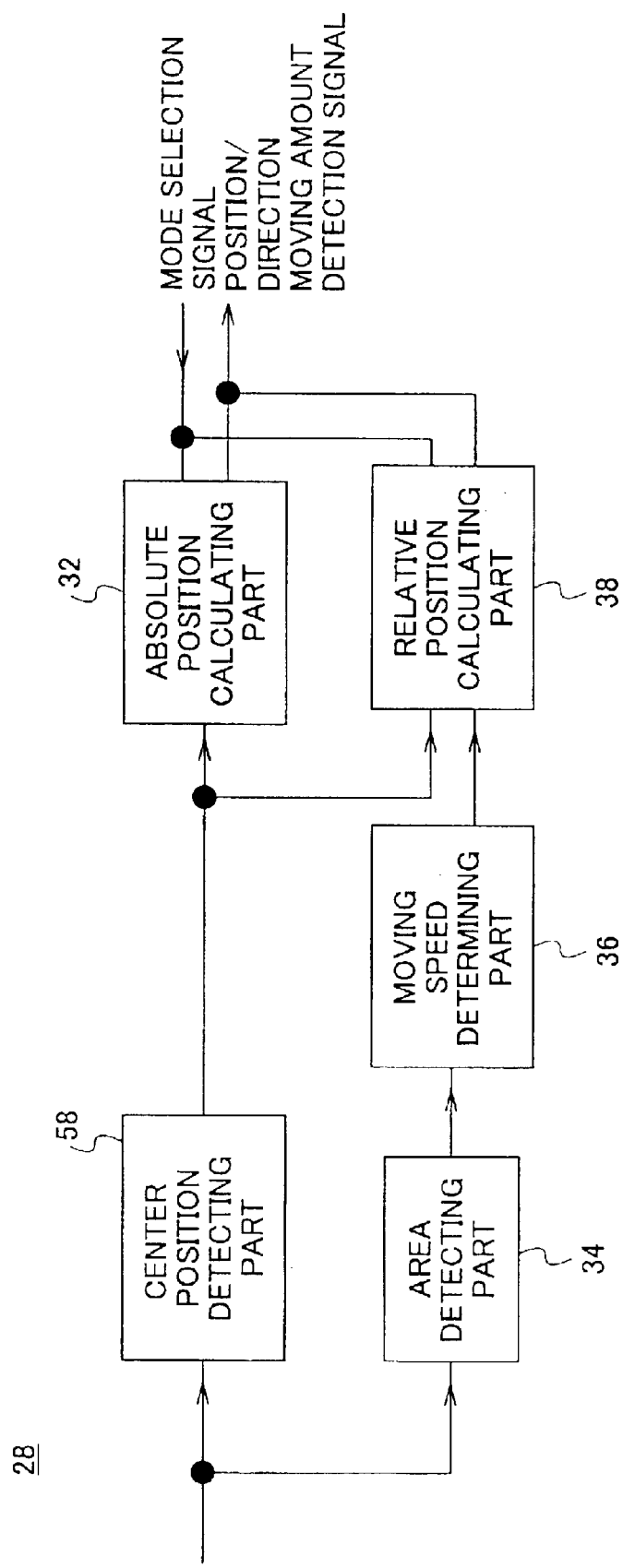
FIG. 13 is a block diagram showing the position/direction detecting part in a center pattern.

Next, a description will be given of a center pattern in which the coordinate position is detected by using a center position instead of the barycenter position. As shown in FIG. 13, in the block diagram of the position/direction detecting part 28 in the center pattern, the barycenter position detecting part 30 in the barycenter pattern is replaced with a center position detecting part 58. The other parts, that is, the absolute position calculating part 32, the area detecting part 34, the moving speed determining part 36 and the relative position calculating part 38 are the same as those corresponding parts in the barycenter pattern.

First, prior to a description of a flow chart showing the process in which the center position detecting part 58 detects the center, the "center" in this embodiment is defined.

To begin with, a collection of the boxes determined as the contact area is represented by M.

$$M=\{(i,j)|P_v \geq C\} \qquad \text{(Formula 6)}$$

The maximum value of i in the boxes belonging to the collection M is represented by $x_{max}$.

$$x_{max}=\max\{i|(i,j)\in M\} \qquad \text{(Formula 7)}$$

The minimum value of i in the boxes belonging to the collection M is represented by $x_{min}$.

$$x_{min}=\min\{i|(i,j)\in M\} \qquad \text{(Formula 8)}$$

The maximum value of j in the boxes belonging to the collection M is represented by $y_{max}$.

$$y_{max} = \max\{j|(i,j) \in M\} \quad \text{(Formula 9)}$$

The minimum value of j in the boxes belonging to the collection M is represented by $y_{min}$.

$$y_{min} = \min\{j|(i,j) \in M\} \quad \text{(Formula 10)}$$

Thus obtained $x_{max}$, $x_{min}$, $y_{max}$ and $y_{min}$ correspond to the respective values shown in FIG. 12. From these $x_{max}$, $x_{min}$, $y_{max}$ and $y_{min}$, the center is defined as follows.

$$\left(\frac{x_{max} + x_{min}}{2}, \frac{y_{max} + y_{min}}{2}\right) \quad \text{(Formula 11)}$$

Figure 14:
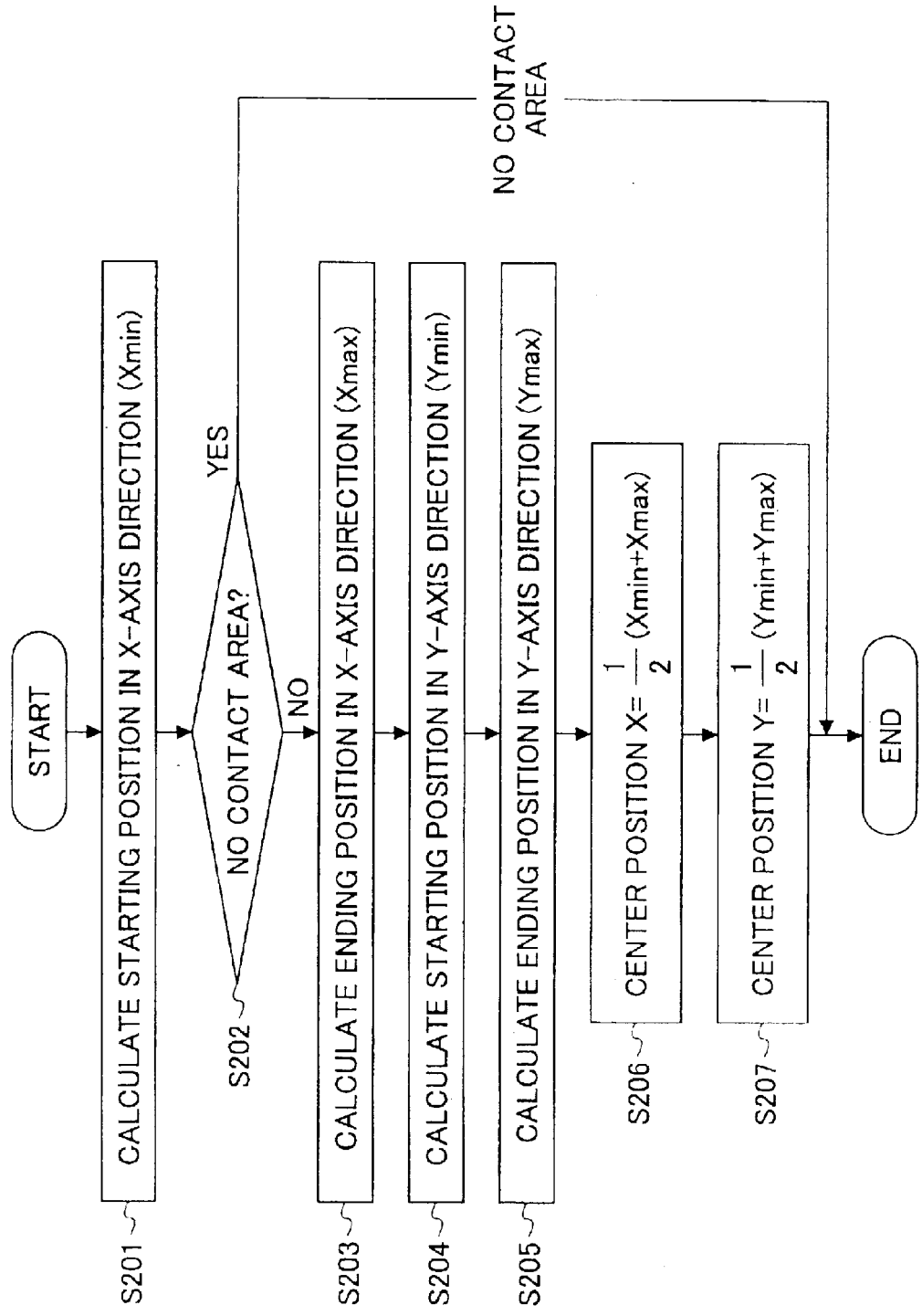
FIG. 14 is a flow chart for explaining a process of obtaining a center.

A description will be given of the above-described process of obtaining the center, with reference to the flow chart in FIG. 14. First, $x_{min}$ (a starting position in X-axis direction) is obtained in the first step S201. Step S201 is a function of the C language, for example, having $x_{min}$ as a returned value. In a case of the non-contact area where $x_{min}$ is not calculated, a process having "−1" as the returned value is performed. Then, step S202 determines whether or not the contact area does not exist. When the result in step S201 is "−1", the result indicates that all boxes are in the non-contact area. Accordingly, in step S202, it is determined that there is no contact area (YES in step S202), and the process ends. When $x_{min}$ is calculated in step S201, since it is determined that the contact area exists in step S202 (NO in step S202), a process of calculating $x_{max}$ (an ending position in X-axis direction) is performed in step S203, and the process relating to the X-axis ends. Similarly, regarding the Y-axis, $y_{max}$ (a starting position in Y-axis direction) and $x_{min}$ (an ending position in Y-axis direction) are calculated in steps S204 and S205, respectively. When $x_{max}$, $x_{min}$, $y_{max}$ and $y_{min}$ are calculated in this manner, by obtaining the midpoint (center position X) of $x_{max}$ and $x_{min}$ in step S206 and obtaining the midpoint (center position Y) of $y_{max}$ and $y_{min}$ in step S207, it is possible to obtain the center of the Formula 11.

Figure 15:
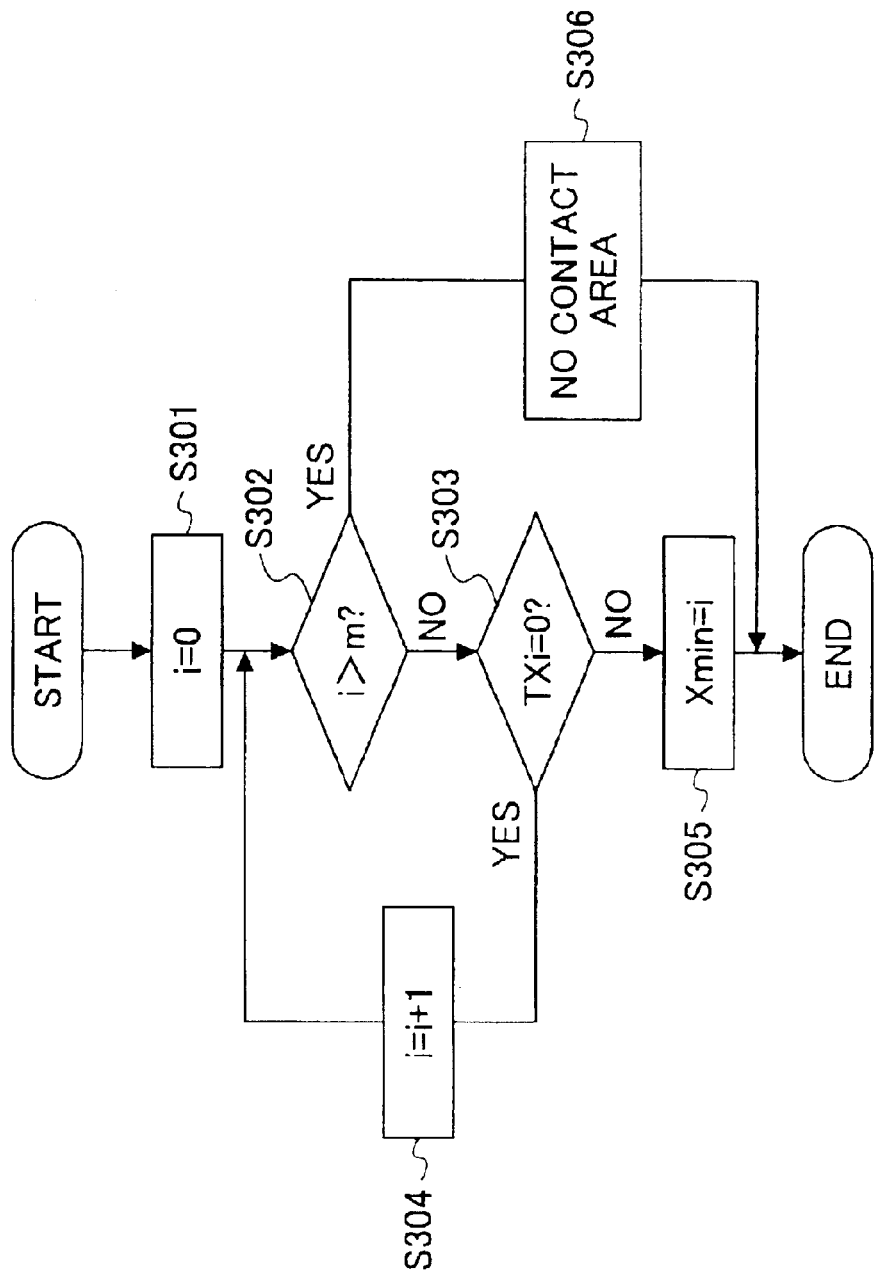
FIG. 15 is a flow chart for explaining a process of obtaining a starting position in the X-axis direction ($X_{min}$)
Figure 16:
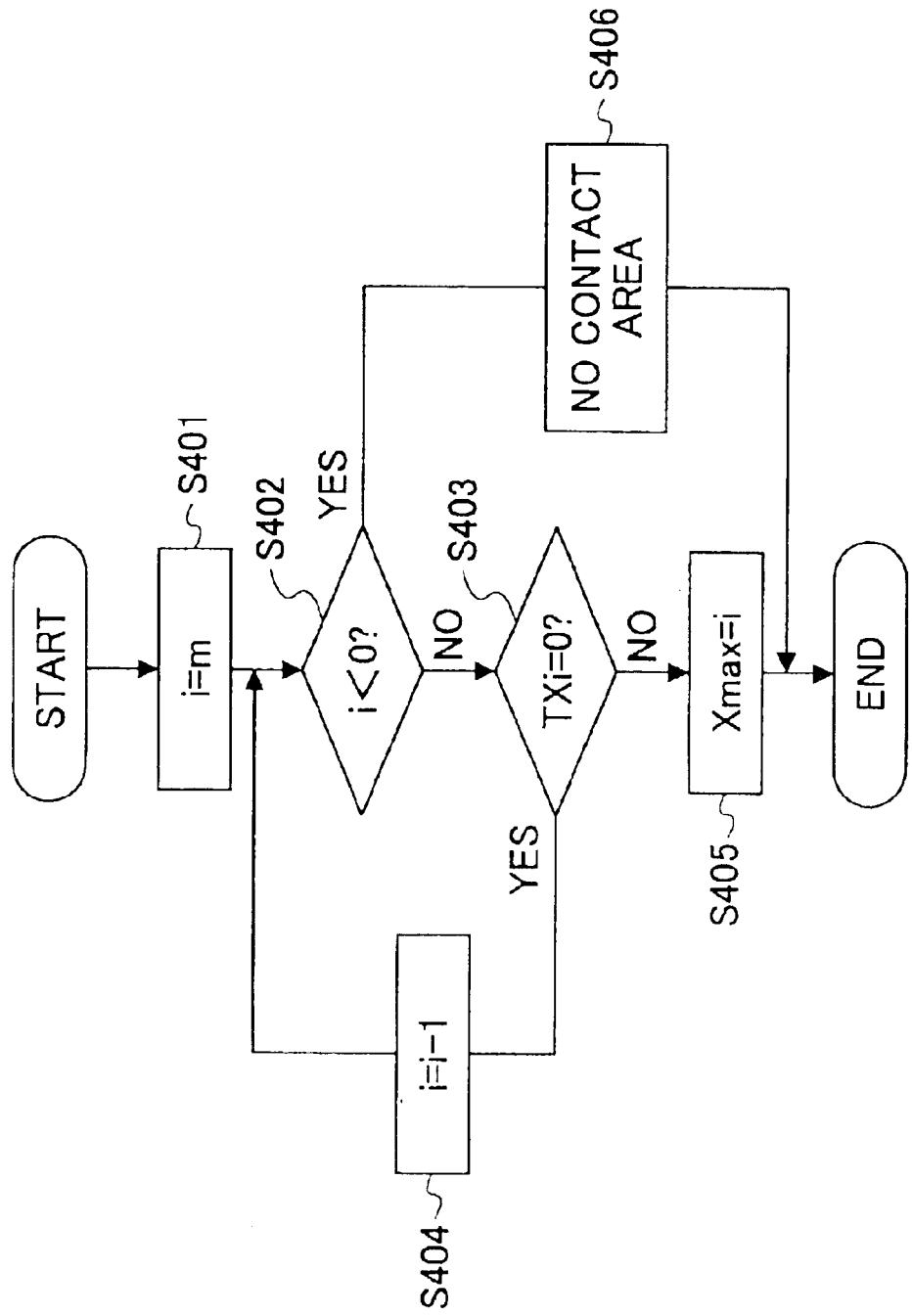
FIG. 16 is a flow chart for explaining a process of obtaining an ending position in the X-axis direction ($X_{max}$)

Among the above-described processes, a description will be given of examples of the processes in steps S201 and S203, by referring to FIGS. 15 and 16. First, a description will be given of the process of step S201, with reference to the flow chart of FIG. 15. In step S301, the loop counter i is initialized to 0. In the next step S302, whether or not i is larger than m is determined. The loop counter i is the counter for counting the number of the boxes arranged in the X-axis direction. Thus, when i becomes larger than m that is the number of the boxes arranged in the X-axis direction (YES in step S302), it is considered that no contact area (fingerprint pattern) exists in step S306, and the process ends. When i is equal to or less than m (NO in step S302), whether or not $Tx_1$ is 0 is determined in step S303. In this determination process, when the projection value $Tx_i$ is 0 (YES in step S303), no contact area exists in the "i"th boxes. Thus, i is incremented in step S304, and the process of step S302 is repeated. In a case where the projection value $Tx_1$ is not 0 (NO in step S303), the contact area is detected for the first time in the "i"th boxes. Accordingly, in step S305, i is substituted in $x_{min}$, and the process ends.

Next, a description will be given of the process of step S203 in which $x_{max}$ is obtained, by referring to the flow chart of FIG. 16. In step S401, the loop counter i is initialized to m. In the next step S402, whether or not i is less than 0 is determined. The loop counter i is the counter for counting from m to 0. Thus, when i becomes less than 0 (YES in step S402), it is considered that no contact area exists in step S406, and the process ends. When i is larger than 0 (NO in step S402), whether or not $Tx_1$ is 0 is determined in step S403. In this determination process, when the projection value $Tx_1$ is 0 (YES in step S403), the contact area is not detected in the "i"th boxes. Accordingly, i is decremented in step S404, and the process of step S402 is repeated. In a case where the projection value $Tx_i$ is not 0 (NO in step S403), the contact area is detected for the first time in the "i"th boxes. Thus, in step S405, i is substituted in $x_{max}$, and the process ends.

As described above, in this pattern (the center pattern), the coordinate position is detected by obtaining the center position. The thus detected coordinate position is, as shown in FIG. 12, reflected in the display of the display unit 50. In this manner, the input device 10 calculates the coordinate position by the two kinds of patterns: the barycenter pattern and the center pattern.

Next, a description will be given of a determination method of a click operation, that is, determining whether a click or a double-click is performed, by using the detection of the barycenter or the center, with reference to FIG. 17.

In the graph of FIG. 17, the vertical axis represents whether or not the barycenter is detected, and the horizontal axis represents time (t). Ton1, Toff1, Ton2 and Toff2 are plotted on the horizontal axis. Ton1 and Ton2 indicate the time when the barycenter is detected (with barycenter). Toff1 and Toff2 indicate the time when the barycenter is not detected (without barycenter). A description will be given of a method of detecting a click by using Ton1, Toff1, Ton2 and Toff2, and "click-ON time" and "click-OFF time" that are predetermined. It should be noted that, in the following description, a case using the barycenter is explained, however, the center may be used instead of the barycenter.

First, a description will be given of the determination of a click. The above-described "click-ON time" refers to the time that is compared with the time until the barycenter is not detected anymore after the barycenter is detected. If the time until the barycenter is not detected anymore after the barycenter is detected is shorter than the "click-ON time", it is determined that a click is made. Therefore, in a case where Ton1 is the time when the barycenter is detected and Toff1 is the time when the barycenter is not detected anymore, when the inequality 0<Toff1−Ton1<"click-ON time" is satisfied, it is determined that a click is made.

Next, a description will be given of the determination of a double-click. A double-click means that two clicks are successively detected. When the interval between the two clicks is too long, the two clicks are determined not to be a double-click. The "click-OFF time" is the time limit of the interval between the two clicks. Thus, the determination of a double-click is made by three determinations: two determinations of click and an interval determination between clicks. The determination inequalites are:

0<*Toff*1−*Ton*1<click-ON time (the first click determination)

0<*Ton*2−*Toff*1<click-OFF time (interval determination of two clicks)

0<*Toff*2−*Ton*2<click-ON time (the second click determination)

where Ton2 is the time when the barycenter is detected, and Toff2 is the time when the barycenter is not detected anymore. When the three inequalities are all satisfied, the two clicks are determined to be a double click.

In the detection of a click, it is also possible to detect the click by detecting the contact area by not performing the detection (calculation) of the barycenter or the center. In this case, "with barycenter" and "without barycenter" in FIG. 17 are read as "with contact area" and "without contact area".

Figure 18A:
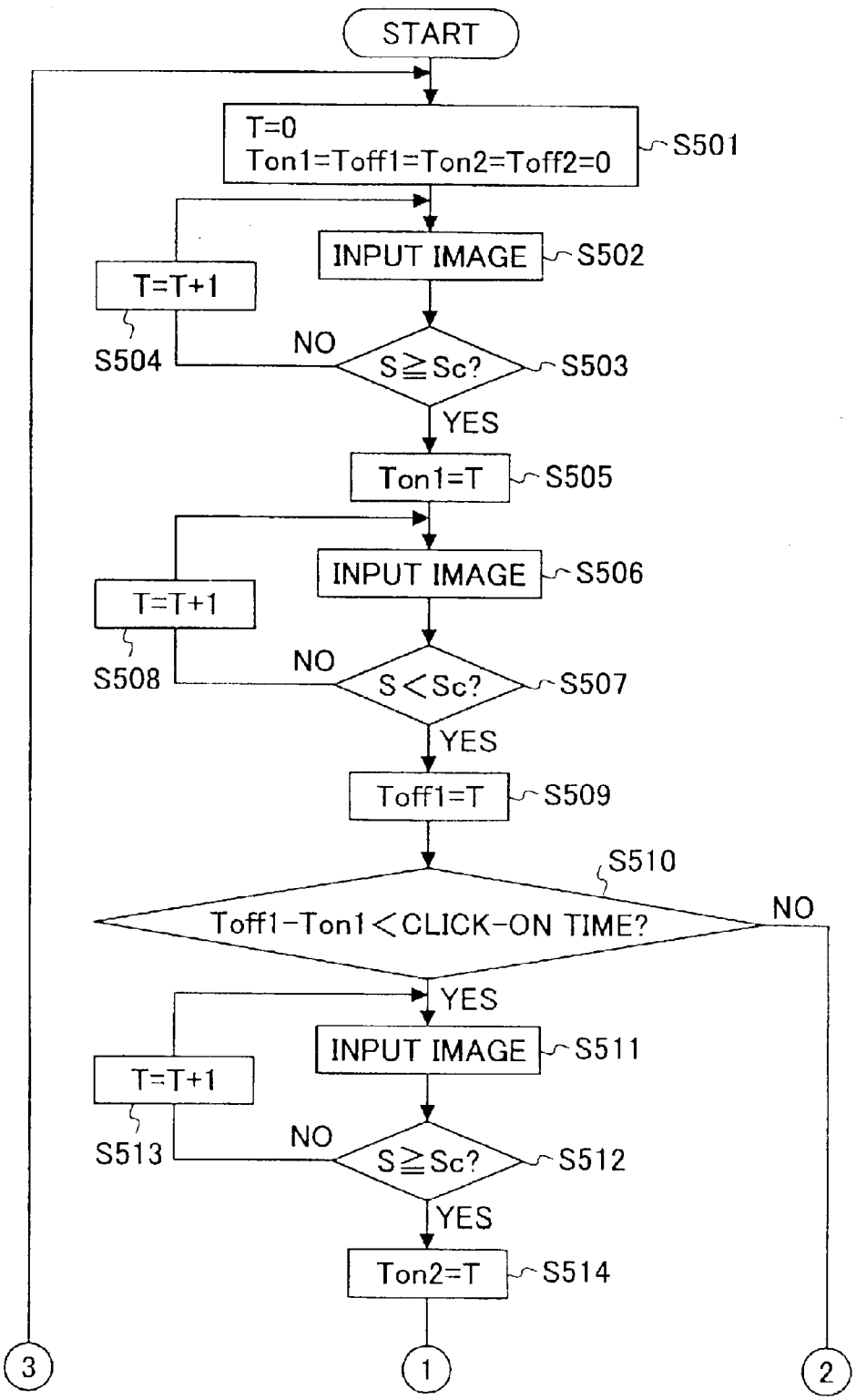
FIG. 18A is the first half of a flow chart for explaining a process of click determination.
Figure 18B:
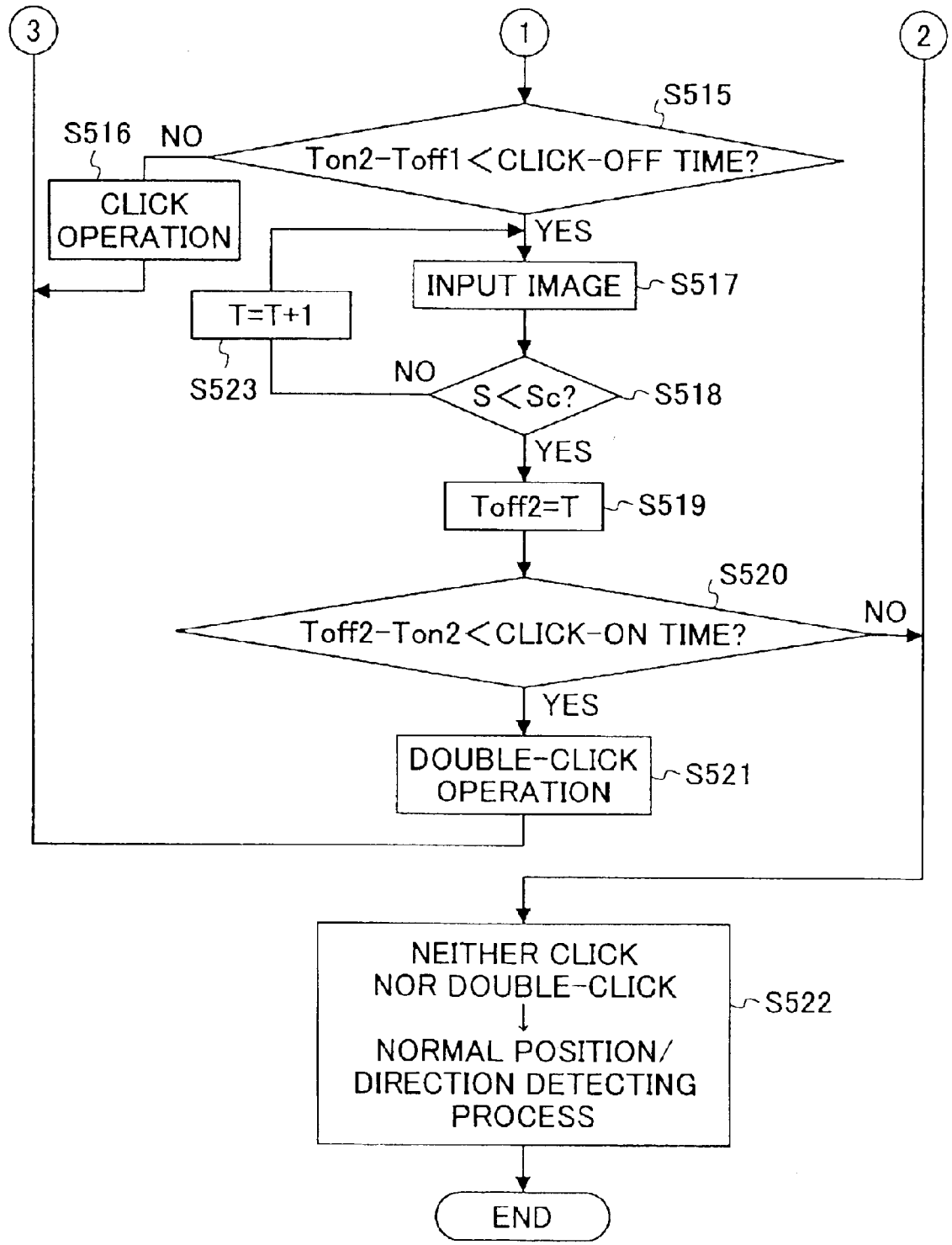
FIG. 18B is the latter half of the flow chart for explaining the process of the click determination.

Next, in addition to the above-described click determination by the detection of barycenter, a description will be given of a method of click determination by the area, with reference to the flow chart extending across FIGS. 18A and 18B. First, a description will be given of variables used in the flow chart. A variable T is a time counter and used for measuring time. Ton1, Toff1, Ton2 and Toff2 are used in the same meaning as mentioned above. S is an area (size) of the contact area, Sc is a threshold value of an area for determining that the finger is pressing the sensor part 12. When S is larger than Sc, it is determined that the finger is pressing the sensor part 12.

Next, a description will be given of the flow chart. First, in step S501, initialization of Ton1, Toff1, Ton2, Toff2, T and 0 are performed. Next, in step S502, the image of the contact area is input, and whether or not S is equal to or larger than Sc is determined in step S503. This determination determines whether or not the finger is touching the sensor part 12. When S is smaller than Sc (NO in step S503), it is determined that the finger is not touching the sensor part 12. Thus, in step S504, the time counter T is incremented, and the process of step S502 is repeated. When S is equal to or larger than Sc (YES in step S503), it is determined that the finger is touching the sensor part 12, and the value of the time counter T is substituted in Ton1 in step S505. Next, in step S506, the image of the contact area is input again, and in the next step S507, whether or not S is smaller than Sc is determined. This determination determines whether or not the finger is touching the sensor part 12. When S is equal to or larger than Sc (NO in step S507), it is determined that the finer is touching the sensor part 12. Accordingly, in step S508, the time counter T is incremented, and the process of step S506 is repeated. When S is smaller than Sc (YES in step S507), it is determined that the finger is not touching the sensor part 12, and the value of the counter T is substituted in Toff1 in step S509. At this moment, since Ton1 and Toff1 are obtained, the first click determination is performed in step S510. Similar to the click determination according to the barycenter, the click determination of step S510 determines whether or not "Toff1-Ton1<click-ON time" is satisfied. When not satisfied (NO in step S510), neither a click nor a double-click is performed. Thus, in step S522, the normal position/direction detecting process is performed. When "Toff1-Ton1<click-ON time" is satisfied (YES in step S510), it is confirmed that a click is made. Then, in step S511, the image of the contact area is input again, the area S is obtained, and whether or not the area S is equal to or larger than Sc is determined in step S512. When S is smaller than Sc (NO in step S512), since the finger is not touching the sensor part 12, the time counter T is incremented in step S513, and the process of step S511 is repeated. When S is equal to or larger than Sc (YES in step S512), the value of the counter T is substituted in Ton2 in step S514. Since Ton2 is obtained here, whether or not "Ton2-Toff1<click-OFF time" is satisfied is determined in step S515 (the interval determination of two clicks). When "Ton2-Toff1<click-OFF time" is not satisfied (NO in step S515), since the interval is long, it is determined that the click is a single click in step S516, and the process proceeds to step S501 so as to prepare for the next process. When "Ton2-Toff1<click-OFF time" is satisfied (YES in step S515), the image of the contact area is input again in step S517, the area S is obtained, and whether or not the area S is smaller than Sc is determined in step S518. When S is smaller than Sc (YES in step S518), the finger is not touching the sensor part 12.

Thus, in step S519, the value of the time counter T is substituted in Toff2 in step S519. When S is not smaller than Sc (NO in step S518), the time counter T is incremented in step S523, and the process of step S517 is repeated. At this moment, since Ton2 and Toff2 are obtained, whether or not a click is made is determined in step S520 (the second click determination). Similar to the click determination according to the barycenter, the click determination of step S520 determines whether or not "Toff2-Ton2<click-ON time" is satisfied. When not satisfied (NO in step S520), since neither a click nor a double-click is made, the normal position/direction detecting process is performed in step S522. When "Toff2-Ton2<click-On time" is satisfied (YES in step S521), in step S521, it is determined that a double-click is made, and the process returns to step S501 so as to prepare for the next process.

As mentioned above, unlike the determination according to the barycenter or the center, in the determination according to the area, it is possible to perform the determination of a click and a double-click even though the finger is not completely taken off from the sensor part 12.

Here, a description will be given of a determination method of the moving speed of a mouse cursor. As mentioned above, the determination of the moving speed of the mouse cursor is performed by the moving speed determining part 36 according to the area obtained by the area detecting pat 34 (refer to FIG. 8). In the following, the determination method of the moving speed is explained.

To begin with, a description will be given of a general overview of the determination method. In the determination method, since the speed is determined according to the area, the area at the lowest speed and the area at the highest speed are set beforehand. Then, based on the set two areas, the speed at the detected area is determined.

Figure 40:
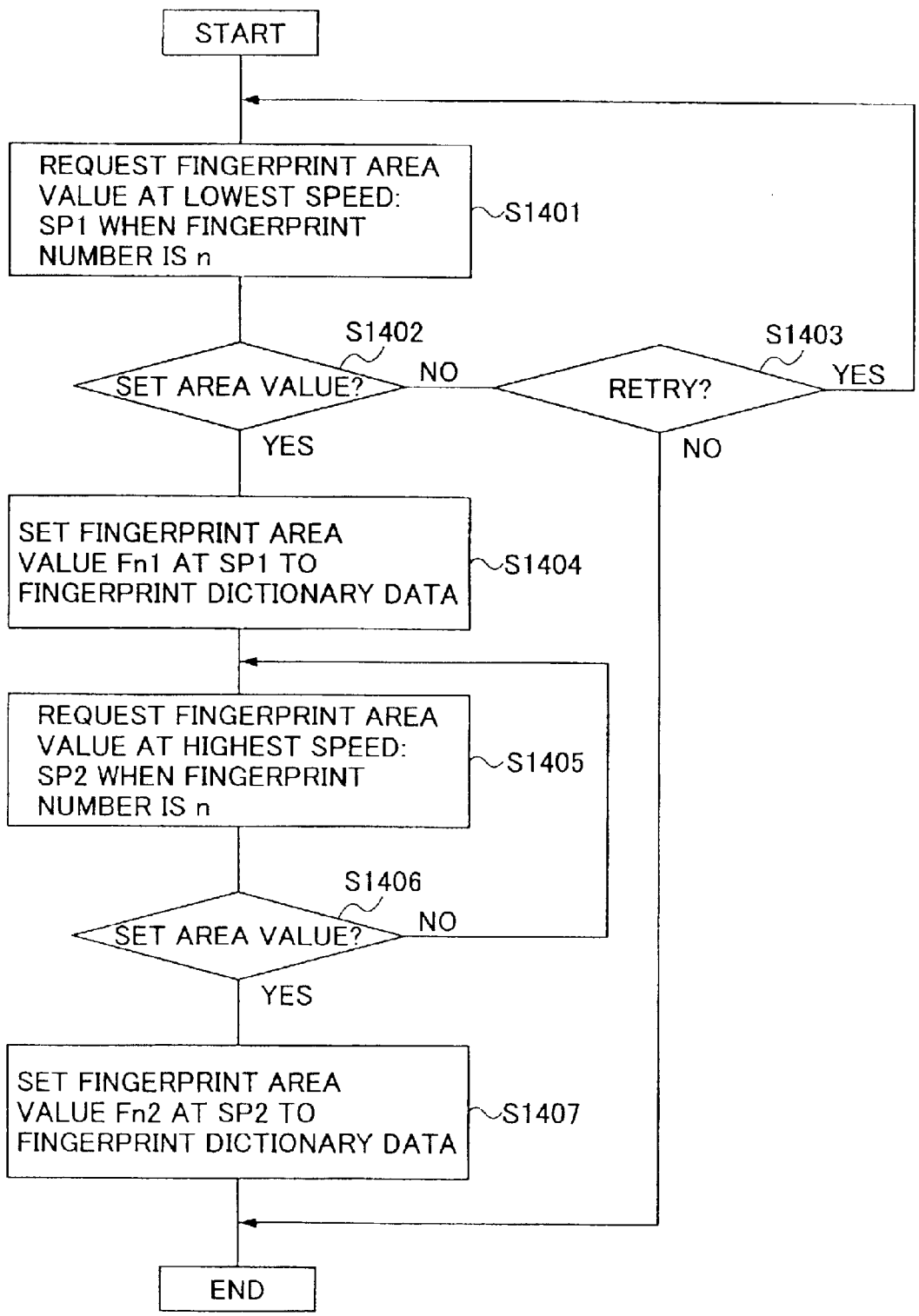
FIG. 40 is a flow chart for explaining a process of setting a moving speed.

A detailed description will be given of the process of the determination method. FIG. 40, which will be explained first, is a flow chart showing the setting process of the lowest speed and the fastest speed.

First, in step S1401, the MCU 18 requests, from the area detecting part 34, the value of a fingerprint area at SP1 that is the lowest speed when a finger number is n. It should be noted that the finger number n refers to the number appointed to each finger, such as 1 through 5 for the little finger to the thumb of the right hand.

Next, in step S1402, the MCU 18 determines whether or not to set the area value. When the MCU 18 determines to set the area value (YES in step S1402), the process proceeds to step S1404. When the area value is not set (NO in step S1402), in step S1403, it is determined whether or not to retry requesting the area value. Then, when the retry is not performed (No in step S1403), the MCU 18 ends the process. When the retry is performed (YES in step S1403), the process returns to step S1401.

In step S1402, when the MCU 18 determines to set the area value of the fingerprint (hereinafter referred to as the "fingerprint area value"), in step S1404, the MCU 18 sets a fingerprint area value Fn1 at SP1 to the fingerprint dictionary data 24.

Here, a description will be given of the fingerprint dictionary data 24. As shown in FIG. 41, the fingerprint dictionary data 24 includes data having fingerprint authentication data, the lowest speed SP1 in the fingerprint authentication data, the fingerprint area value Fn1 at the lowest speed SP1, a highest speed SP2, and a fingerprint area value Fn2 at the highest speed SP2, for each fingerprint authentication data.

The description of the flow chart will now be continued. In step S1405, the MCU 18 requests, from the area detecting part 34, the fingerprint area value Fn2 at SP2, which is the highest speed when the finger number is n.

Then, in step S1406, the MCU 18 determines whether or not to set the area value. When the MCU 18 determines to set the area value (YES in step S1406), in step S1407, the MCU 18 sets the fingerprint area value Fn2 at SP2 to the fingerprint dictionary data 24 and ends the process.

The moving speed is determined by using thus set fingerprint area values at the lowest and highest speeds. A description will be given of this determination method, with reference to FIG. 42.

Figure 42:
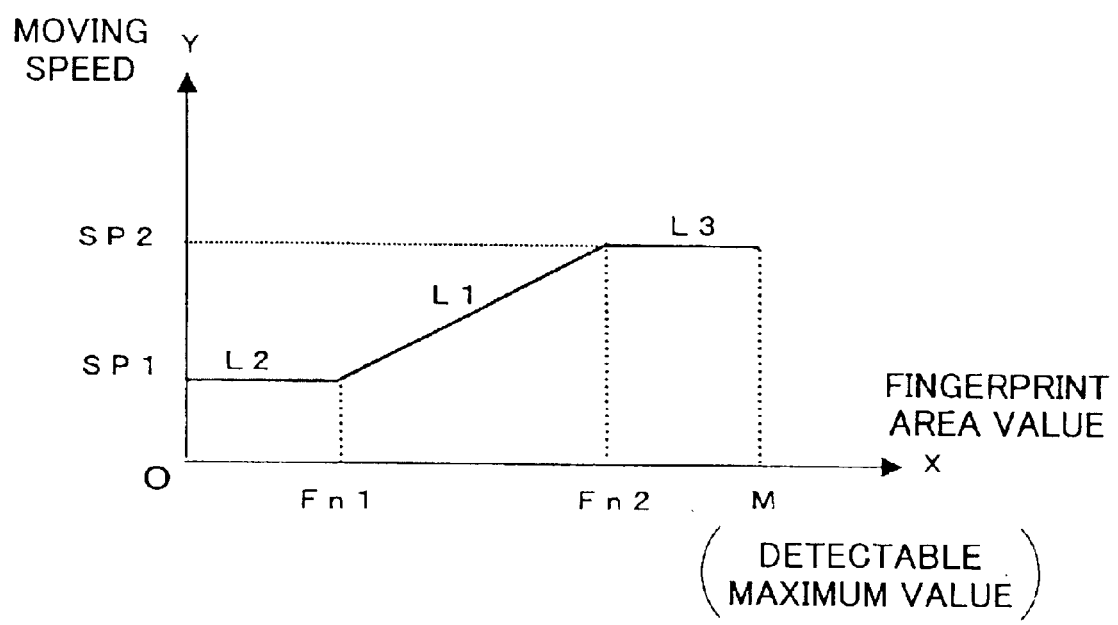
FIG. 42 is a graph for determining the moving speed.

In the graph shown in FIG. 42, the horizontal axis represents the fingerprint area value, and the vertical axis represents the moving speed. Segments L1, L2 and L3 are shown in the graph. The segment L1 is made such that pairs of the lowest and highest speeds and fingerprint area values, (Fn1, SP1) and (Fn2, SP2), are plotted and connected. In addition, the segment L2 is a segment connecting (Fn1, SP1) and (0, SP1). Further, the segment 3 is a segment connecting (Fn2, SP2) and (M, SP2). It should be noted that M is the maximum value of the fingerprint area values that can be detected by the area detecting part 34.

Figure 43:
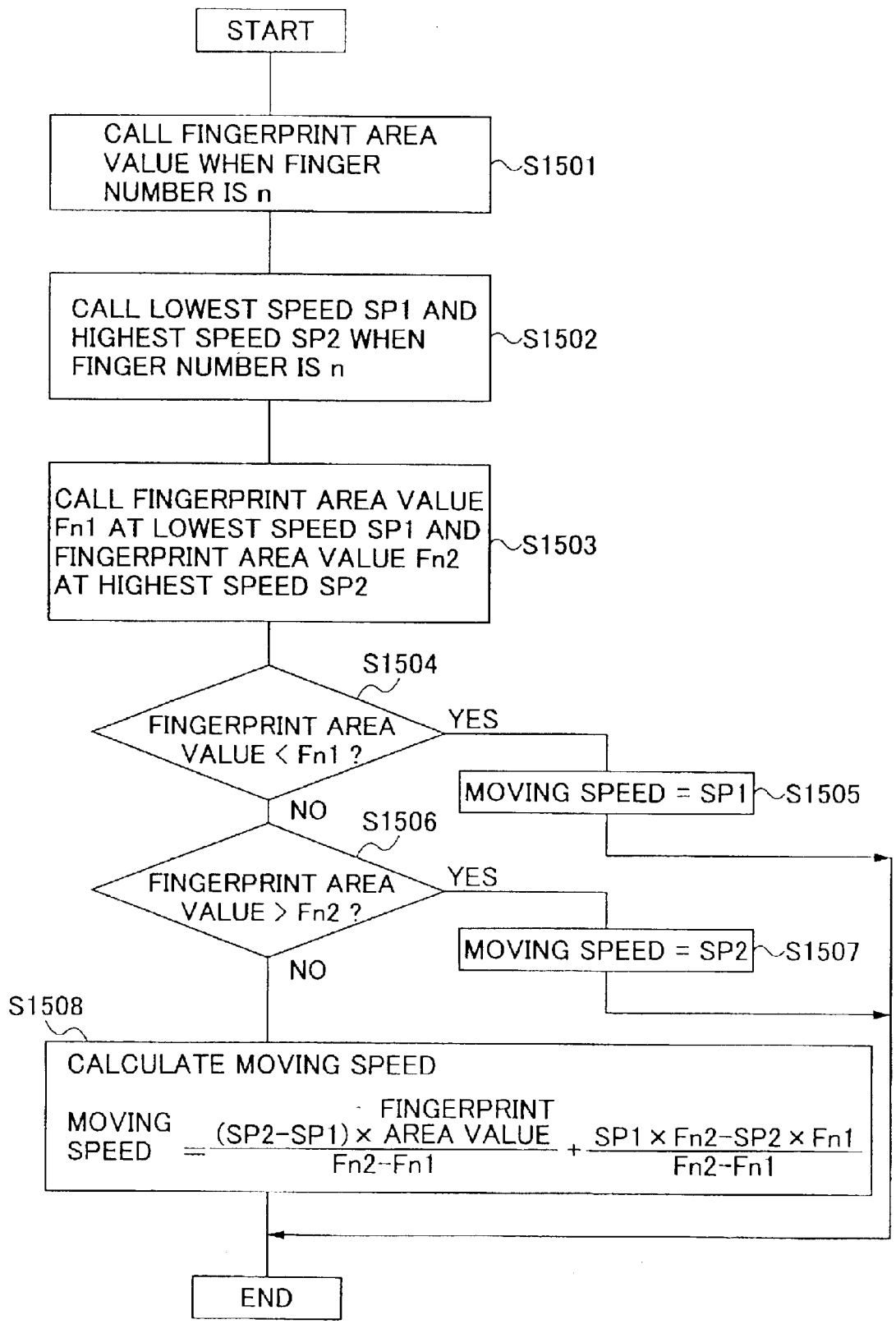
FIG. 43 is a flow chart for explaining a process of determining the moving speed.

The moving speed is determined according to the flow chart of FIG. 43 by using the three segments. In the following, a description will be given of the flow chart.

First, in order to detect a current fingerprint area value, in step S1501, the MCU 18 retrieves (calls) the fingerprint area value having the finger number n from the area detecting part 34. Then, in step S1502, the MCU 18 retrieves the lowest speed SP1 and the highest speed SP2 that are set earlier. In addition, in step S1503, the MCU 18 also retrieves the fingerprint area value Fn1 at the lowest speed SP1 and the fingerprint area value Fn2 at the highest speed SP2.

Next, in step S1504, the MCU 18 compares the current fingerprint area value and the fingerprint area value Fn1 at the lowest speed SP1. In a case where the current fingerprint area value is smaller than the fingerprint area value Fn1 at the lowest speed SP1 (YES in step S1504), the case corresponds to the segment L2 of FIG. 42. Accordingly, in step S1505, the moving speed is set to SP1.

In step S1506, the MCU 18 compares the current fingerprint area value with the fingerprint area value at the highest speed SP2. In a case where the current fingerprint area value is larger than the fingerprint area value Fn2 at the highest speed SP2 (YES in step S1506), the case corresponds to the segment L3. Thus, in step S1507, the moving speed is set to SP2.

Step S1508 is a process corresponding to a case where the current fingerprint area value is in a section between Fn1 and Fn2. In addition, step S1508 is a process of determining the moving speed corresponding to the segment L1 of FIG. 42.

As shown in step S1508, the moving speed in this case is as follows.

$(SP2-SP1) \times$(fingerprint area value)$/(Fn2-Fn1)+(SP1 \times Fn2-SP2 \times Fn1)/(Fn2-Fn1)$ The equation of the line connecting (Fn1, SP1) and (Fn2, Sp2) is:

$Y-SP1=(SP2-SP1)/(Fn2-Fn1) \times (X-Fn1)$.

Accordingly, by substituting the fingerprint area value in X of the above equation and changing the equation, the equation shown in step S1508 is obtained. Hence, it is possible to determine the moving speed by using the fingerprint area value. Additionally, since the fingerprint dictionary data 24 records a speed parameter for each fingerprint, it is possible to choose the speed by the finger, such as move the mouse cursor fast in a case of the first finger and to move the mouse cursor slowly in a case of the second finger.

Figure 44:
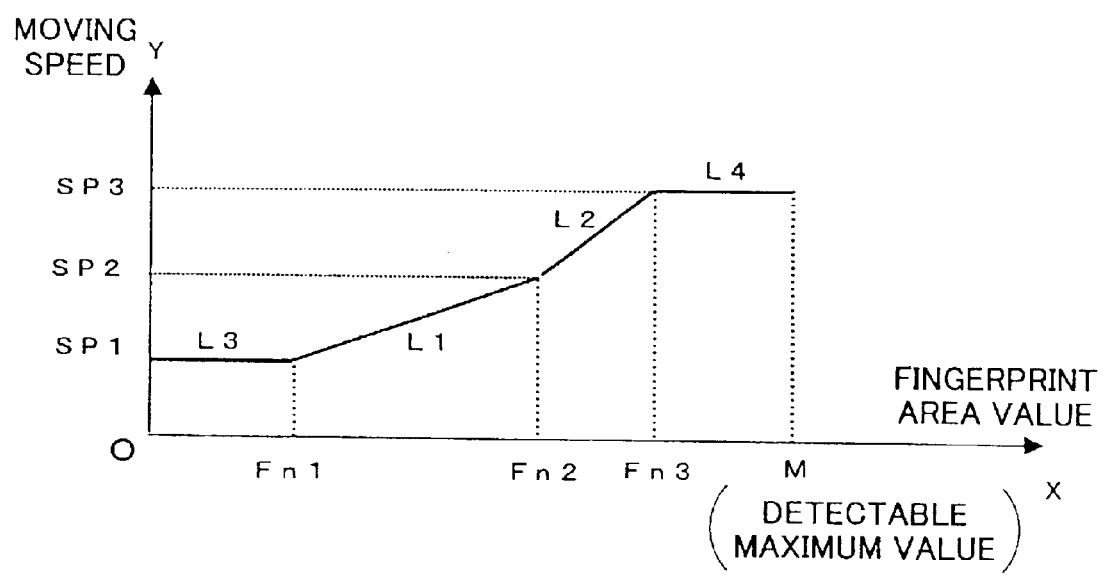
FIG. 44 is another graph for determining the moving speed.

Furthermore, the moving speed may be determined according to the graph shown in FIG. 44 instead of the graph of FIG. 42 in the above description. In the graph of FIG. 44, the moving speed varies in two stages, that is, Fn1 to Fn2 (segment L1 of FIG. 44) and Fn2 to Fn3 (segment L2 of FIG. 44).

The formula for determining the moving speed in the segment L1 of FIG. 44 is the same as the formula of the segment L1 of FIG. 42. The formula for determining the moving speed in the segment L2 of FIG. 44 is as follows.

$(SP3-SP2) \times$(fingerprint area value)$/(Fn3-Fn2)+(SP2 \times Fn3-SP3 \times Fn2)/(Fn3-Fn2)$ Besides the determining method of the moving speed using the plurality of segments as mentioned above, the moving speed may be determined by using a quadric curve and an exponential curve, for example.

Next, a description will be given of a method of determining the moving speed by detecting the outline of the fingerprint or the XY width.

Figure 19:
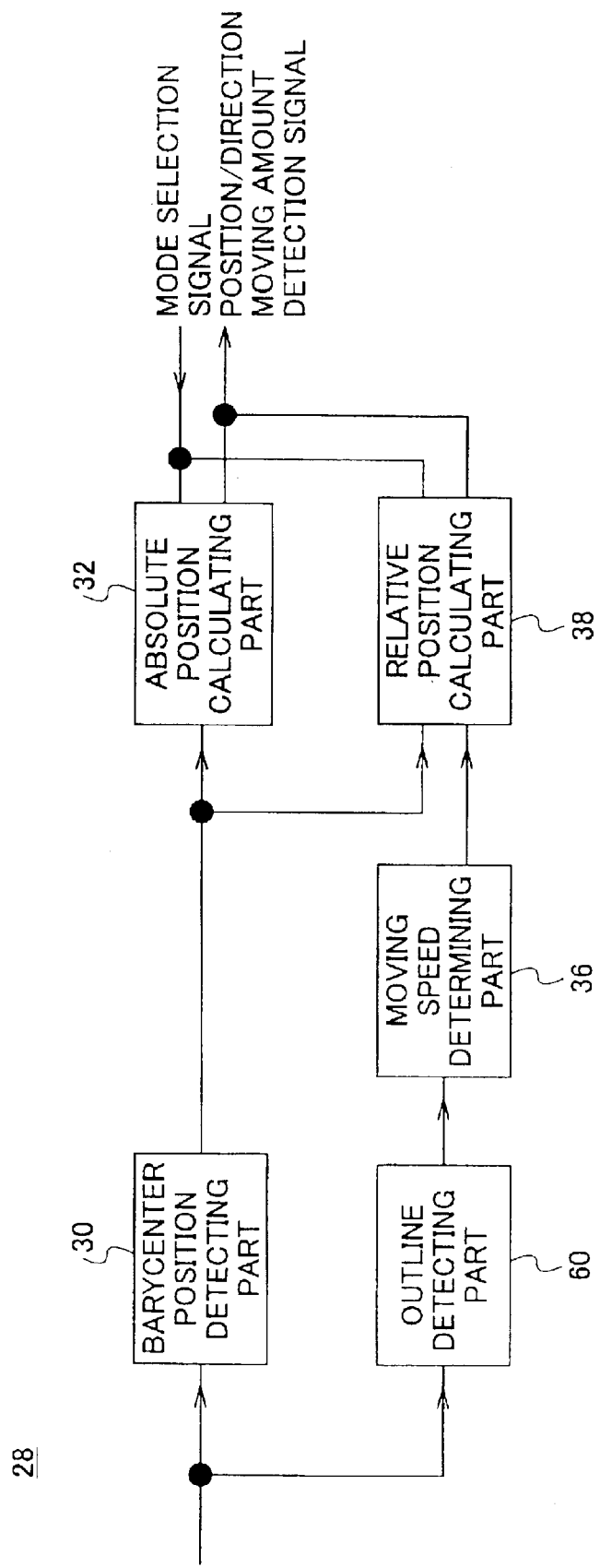
FIG. 19 is a block diagram showing the position/direction detecting part to which an outline detecting part is provided.

Conventionally, when obtaining the outline of a banded image such as a fingerprint image, a differential filter such as 3×3 pixels matrix has been used after filling spaces between the bands. Thus, the process is complex. To eliminate the problem, the present invention uses a method of extracting the outline of the fingerprint relatively easily. In the position/direction detecting part 28 of FIG. 19, instead of the area detecting part 34 of FIG. 8, there is provided an outline detecting part 60 that detects the outline of a fingerprint pattern.

Figure 20:
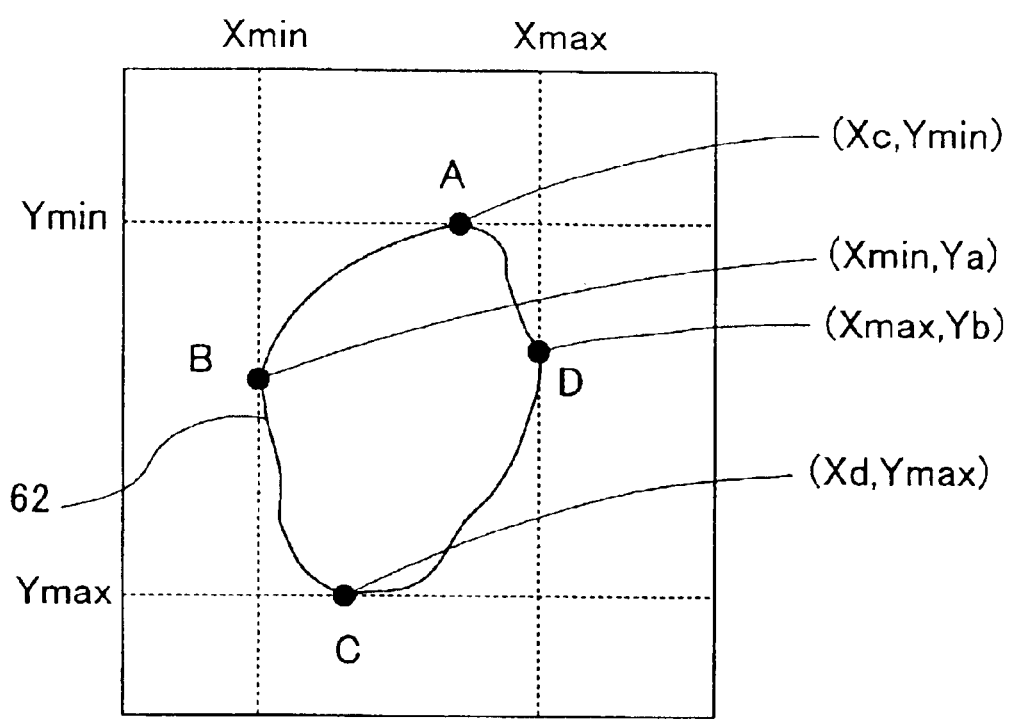
FIG. 20 is a schematic diagram showing the contact area.
Figure 21:
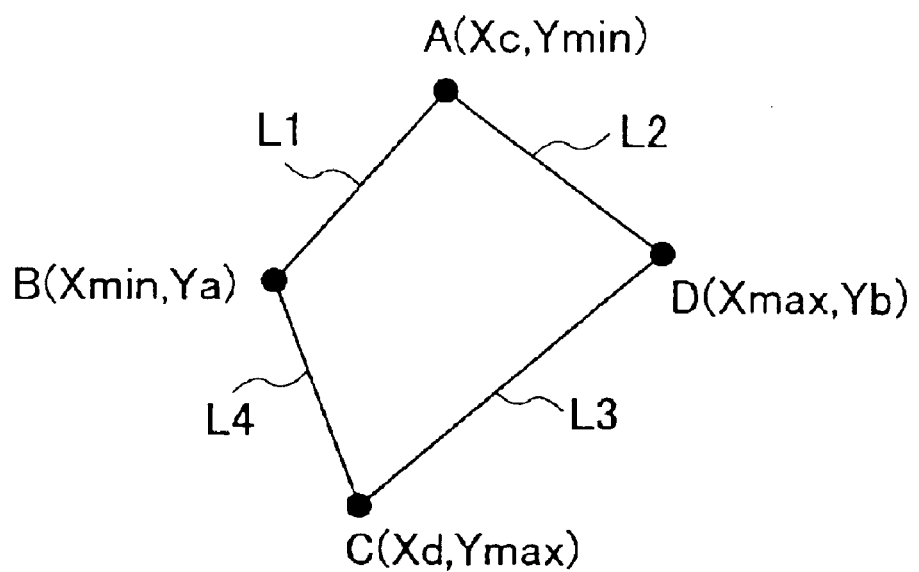
FIG. 21 is a schematic diagram showing the outline of the contact area.

Next, a description will be given of the outline, with reference to FIG. 20. In FIG. 20, a fingerprint pattern 62 on the X-Y coordinate graph, $x_{max}$, $x_{min}$, $y_{max}$, $y_{min}$, a box A ($x_c$, $y_{min}$), a box B ($x_{min}$, $y_a$), a box C ($x_d$, $y_{max}$), and a box D ($x_{max}$, $y_b$) are shown. $X_{max}$, $X_{min}$, $y_{max}$, and $y_{min}$ are defined by the above-described Formulas 6 through 10. The definitions thereof are the same as those definitions in the earlier case. In addition, $x_c$ of the box A is the X coordinate of the box having $y_{min}$ as the y coordinate and being the contact area. $Y_a$ of the box B is the Y coordinate of the box having $x_{min}$ as the X coordinate and being the contact area. $Y_{max}$ of the box C is the Y coordinate of the box having $x_d$ as the X coordinate and being the contact area. Xmax is the X coordinate of the box having yb as the Y coordinate and being the contact area. A drawing drawn by connecting these boxes with straight lines as shown in FIG. 21 is assumed to be the outline.

Figure 22:
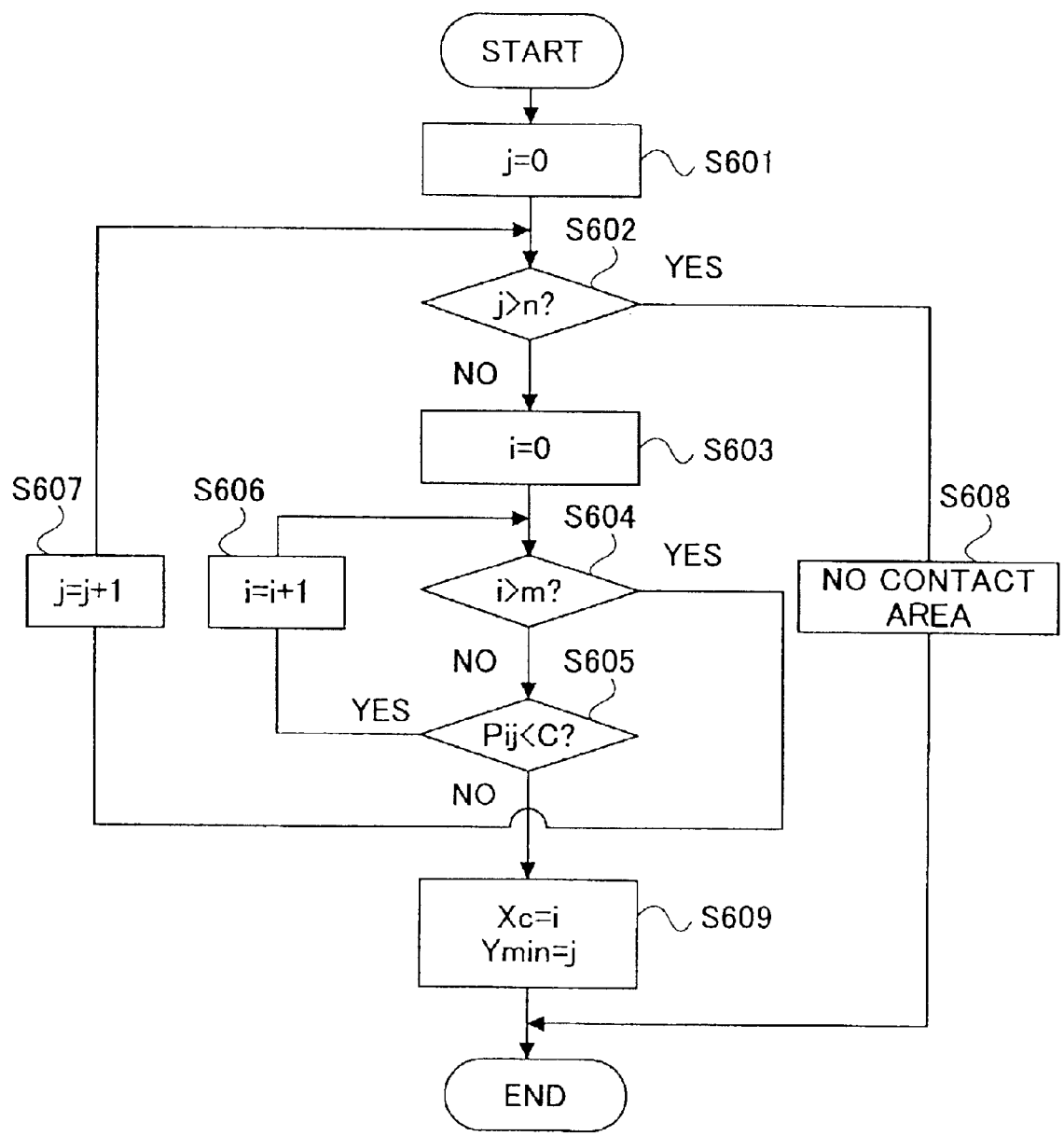
FIG. 22 is a flow chart for explaining a process of obtaining a coordinate A.

Next, the lengths of the segments are obtained. For that purpose, by taking the boxes A, B, C and D as normal coordinates, the sum of the lengths of a segment AB, a segment BC, a segment CD and a segment DA is made the length of the outline. A description will be given of a specific method of obtaining the sum of the lengths, by referring to flow charts. First, a description will be given of a method of obtaining the coordinates of the box A, by referring to the flow chart in FIG. 22. In step S601, the loop counter j is initialized with 0. In step S602, whether or not j is larger than n is determined. When j exceeds n (YES in step S602), it is determined that there is no contact area in step S608, and the process ends. When j is equal to or less than n (NO in step S602), the loop counter i is initialized with 0 in step S603. In step S604, whether or not i is larger than m is determined. When i is larger than m (YES in step S604), j is incremented in step S607, and the process of step S602 is repeated. When i is equal to or smaller than m (NO in step S604), in step S605, whether or not the shading value $P_{ij}$ is smaller than the threshold value C is determined. When $P_{ij}$ is smaller than C (YES in step S605), since the box is the non-contact area, i is incremented in step S606, and the process of step S604 is repeated. When $P_{ij}$ is equal to or larger than C (NO in step S605), it is regarded that the contact area is found for the first time. Thus, i and j at the moment are substituted in $x_c$ and $y_{min}$, respectively, and thus the coordinates of the box A is obtained.

Figure 23:
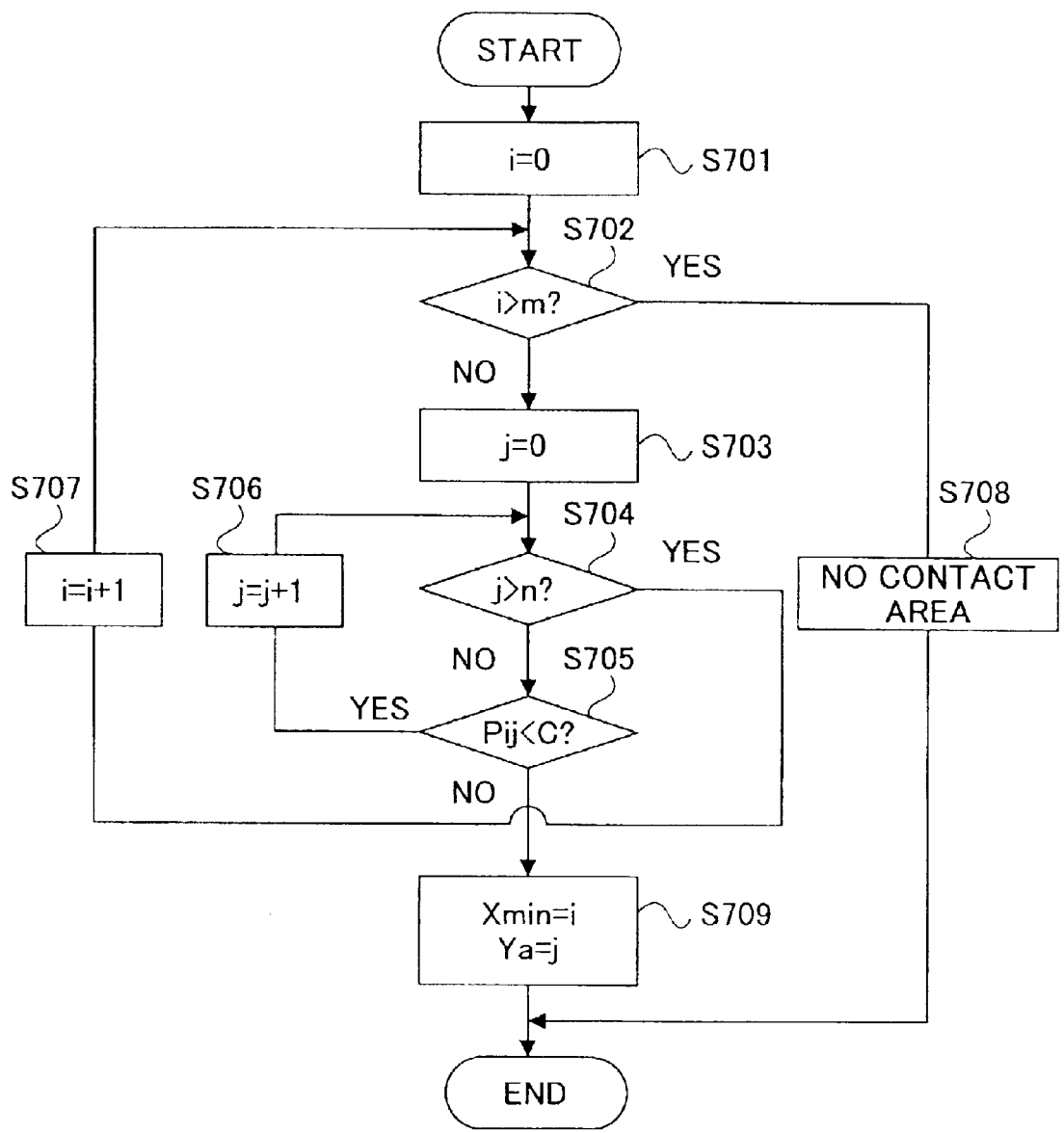
FIG. 23 is a flow chart for explaining a process of obtaining a coordinate B.

Next, a description will be given of a method of obtaining the coordinates of the box B, with reference to the flow chart in FIG. 23. First, in step S701, the loop counter i is initialized with 0. In step S702, whether or not i is larger than m is determined. When i exceeds m (YES in step S702), it is regarded that there is no contact area in step S708, and the process ends. When i is equal to or less than m (NO in step S702), in step S703, the loop counter j is initialized with 0. In step S704, whether or not j is larger than n is determined. When j is larger than n (YES in step S704), i is incremented in step S707, and the process of step S702 is repeated. When j is equal to or less than n (NO in step S704), in step S705, whether or not the shading value $P_{ij}$ is smaller than the threshold value C is determined. When $P_{ij}$ is smaller than C (YES in step S705), since the box is the non-contact area, j is incremented in step S706, and the process of step S704 is repeated. When $P_{ij}$ is equal to or larger than C (NO in step S705), it is considered that the contact area is found for the first time. Accordingly, i and j at the time are substituted in $x_{min}$ and $y_a$, respectively, and thus the coordinates of the box B is obtained.

Figure 24:
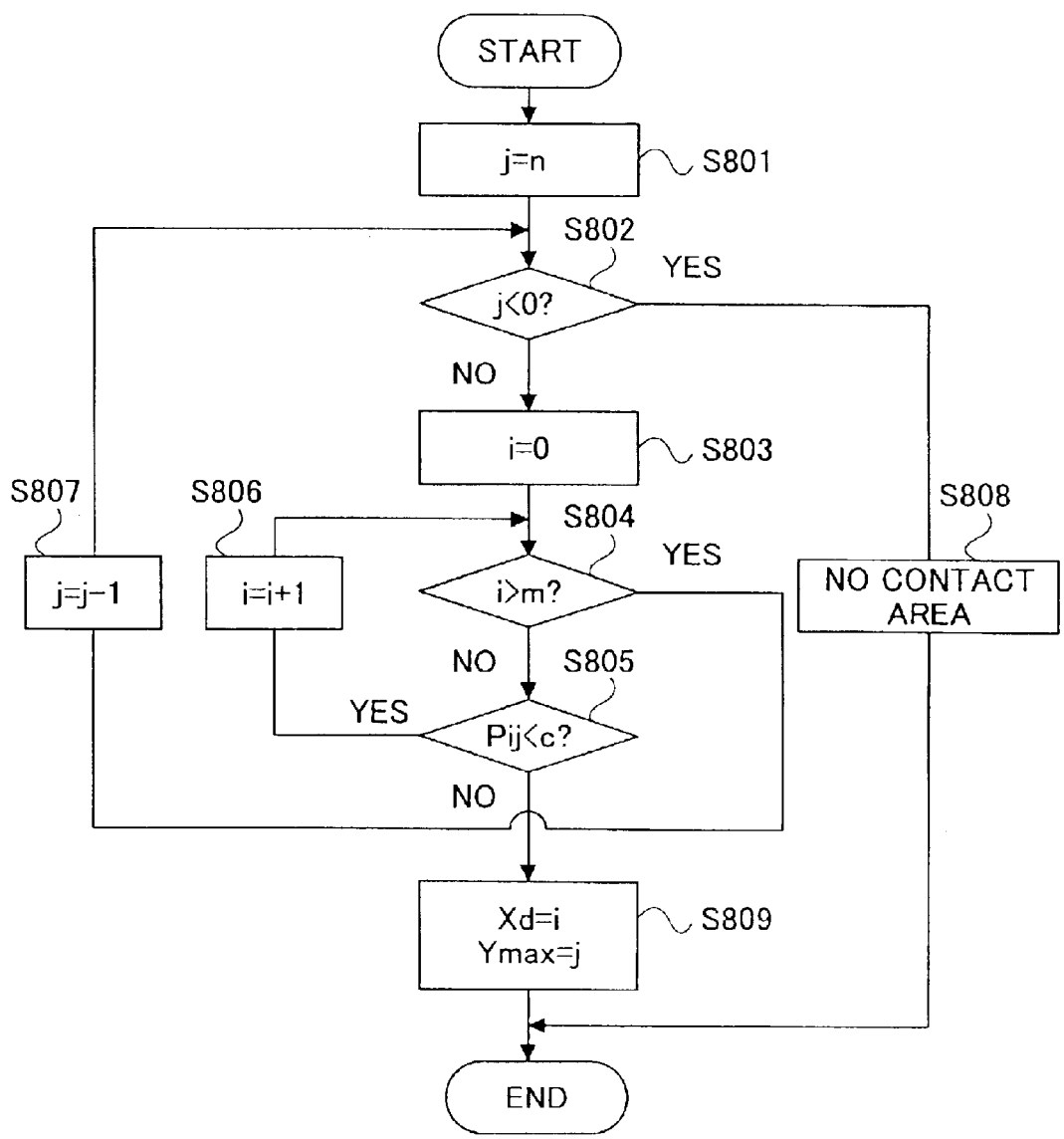
FIG. 24 is a flow chart for explaining a process of obtaining a coordinate C.

Next, a description will be given of a method of obtaining the coordinates of the box C, by referring to the flow chart in FIG. 24. First, in step S801, the loop counter j is initialized with n. In step S802, whether or not j is smaller than 0 is determined. When j is smaller than 0 (YES in step S802), the box is considered as the non-contact area in step S808, and the process ends. When j is equal to or larger than 0 (NO in step S802), the loop counter i is initialized with 0 in step S803. In step S804, whether or not i is larger than m is determined. When i is larger than m (YES in step S804), j is decremented in step S807, and the process of step S802 is performed. When i is equal to or smaller than m (NO in step S804), whether or not the shading value $P_{ij}$ is smaller than the threshold value C is determined in step S805. When $P_{ij}$ is smaller than C (YES in step S806), since the box is non-contact area, i is incremented in step S806, and the process of step S804 is repeated. When $P_{ij}$ is equal to or larger than C (NO in step S806), it is considered that the contact area is found for the first time. Thus, i and j at the time are substituted in $x_d$ and $y_{max}$, respectively, and thus the coordinate of the box C is obtained.

Figure 25:
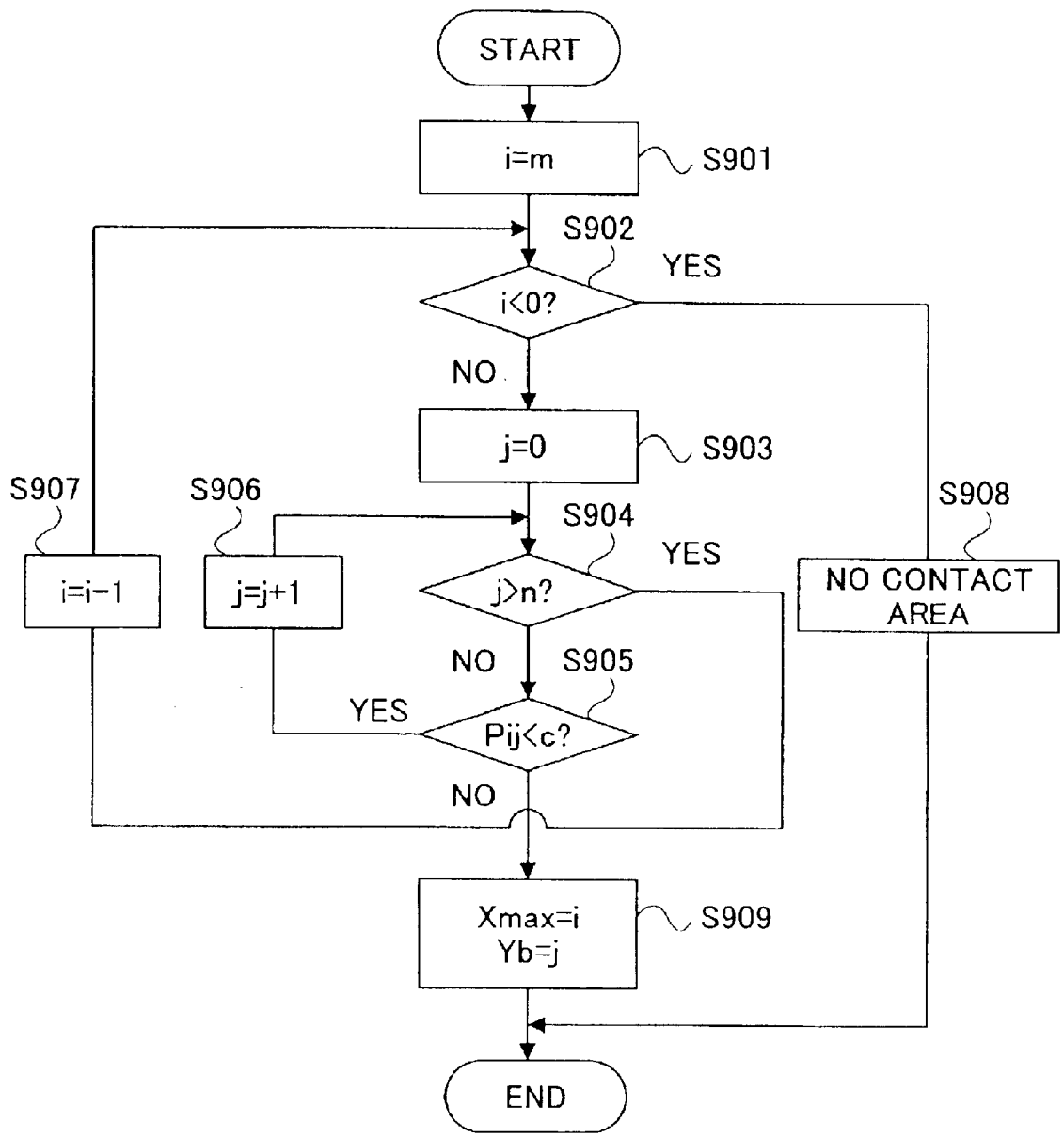
FIG. 25 is a flow chart for explaining a process of obtaining a coordinate D.

Next, a description will be given of a method of obtaining the coordinate of the box D, with reference to the flow chart in FIG. 25. First, in step S901, the loop counter i is initialized with m. In step S902, whether or not i is smaller than 0 is determined. When i is smaller than 0 (YES in step S902), it is considered that there is no contact area in step S908, and the process ends. When i is larger than 0 (NO in step S902), the loop counter j is initialized with 0 in step S903. In step S904, whether or not j is larger than n is determined. When j is larger than n (YES in step S904), i is decremented in step S907, and the process of step S902 is performed. When j is equal to or smaller than n (NO in step s904), whether or not the shading value $P_{ij}$ is smaller than the threshold value C is determined in step S905. When $P_{ij}$ is smaller than C (YES in step S905), the box is the non-contact area. Thus, j is incremented in step S906, and the process of step S904 is repeated. When $P_{ij}$ is equal to or larger than C (NO in step S905), it is considered that the contact area is found for the first time, and the i and j at the time are substituted in $x_{max}$ and $y_b$, respectively, and thus the coordinate of the box D is obtained.

Figure 26:
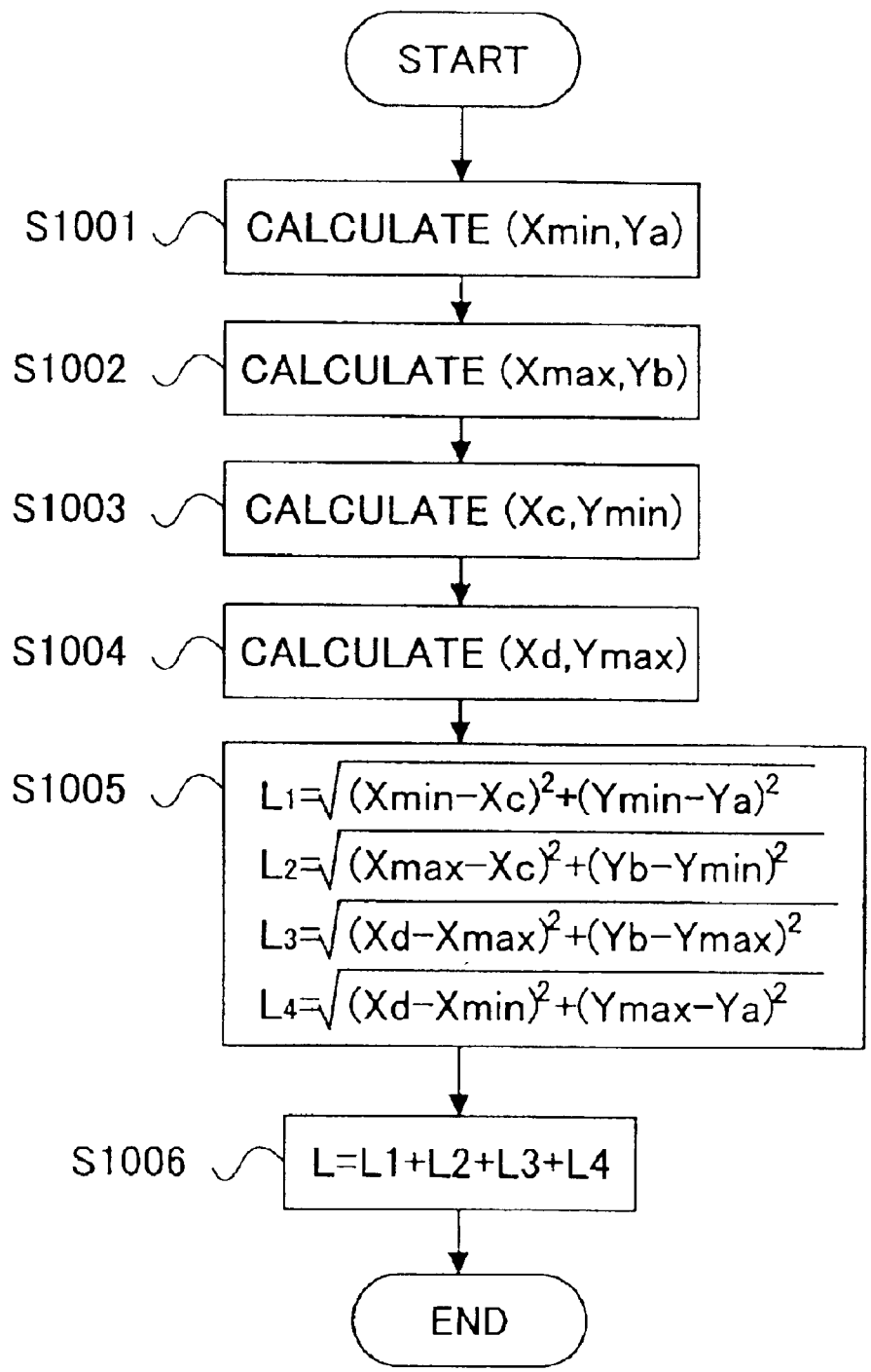
FIG. 26 is a flow chart for explaining a process of obtaining the length of the outline.

Using the above-described processes, a description will be given of a process of obtaining the length of the outline, with reference to the flow chart of FIG. 26. Steps S1001 through S1004 are the above-mentioned processes of obtaining the boxes A, B, C and D. Step S1001 corresponds to the flow chart of FIG. 23. Step S1002 corresponds to the flow chart of FIG. 25. Step S1003 corresponds to the flow chart of FIG. 22. Step S1004 corresponds to the flow chart of FIG. 24. In step S1005, the length of the outline is obtained from the thus obtained boxes A, B, C and D. In step S1005, $L_1$=AB, $L_2$=DA, $L_3$=CD and $L_4$=BC. The measuring method of the distances may be any measuring method that satisfies the definition of the distance in a metric space such as the distance defined in the Euclidean space. After obtaining $L_1$, $L_2$, $L_3$ and $L_4$ in step S1005 by using such a measuring method, a sum (the length of the outline) L of $L_1$, $L_2$, $L_3$ and $L_4$ is calculated in step S1006, and thus the outline is obtained. In this manner, it is possible to obtain the length of the outline more simply than using a differential filter. Additionally, the length L is reflected on the moving speed of the mouse cursor.

Figure 27:
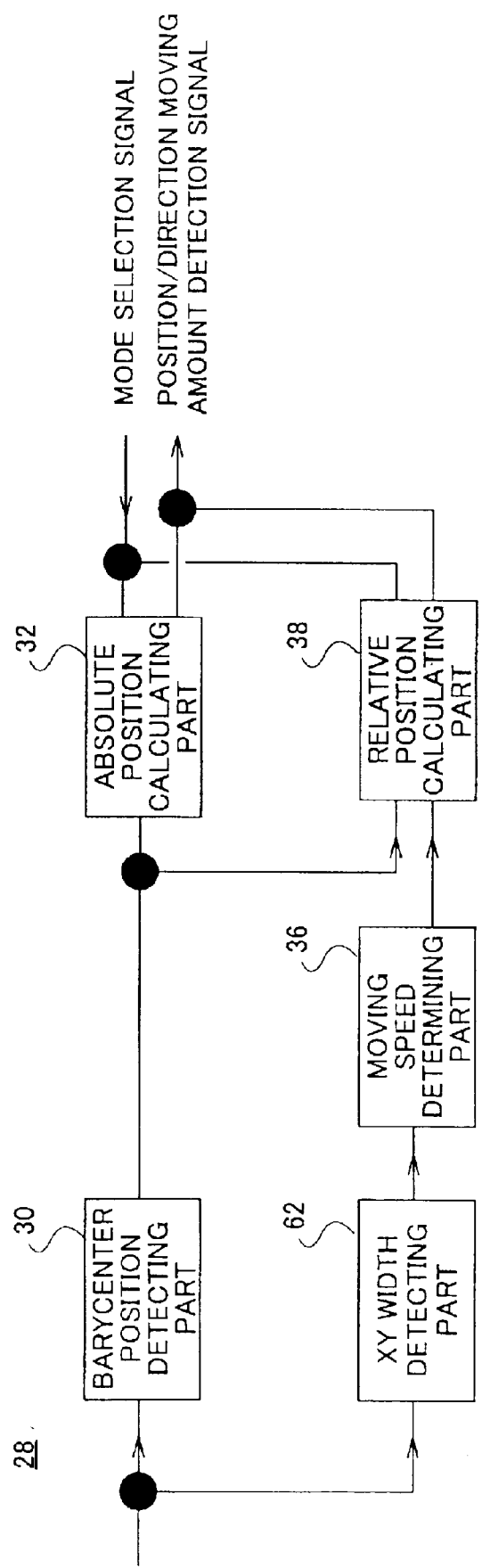
FIG. 27 is a block diagram showing the position/direction detecting part to which an XY width detection part is provided.

Next, a description will be given of a case where the XY width is used, by referring to the block diagram of FIG. 27. In the position/direction detecting part 28 of FIG. 27, instead of the area detecting part 34 of FIG. 8, an XY width detecting part 62 that detects the width (L) of XY is provided. The XY width L is defined as $L=X_{max}-X_{min}+Y_{max}-Y_{min}$, by using $X_{max}$, $X_{min}$, $Y_{max}$ and $Y_{min}$ that are defined by the above-described formulas 6 through 10. In this formula, $X_{max}-X_{min}$ is the length in the X-axis direction of the contact area, and $Y_{max}-Y_{min}$ is the length in the Y-axis direction of the contact area. Accordingly, in a case where $X_{max}$ and $Y_{max}$ are large and $X_{min}$ and $Y_{min}$ are small, that is, where the contact area is vertically and horizontally long, the value of L becomes large. Conversely, in a case where $X_{max}$ and $Y_{max}$ are small and $X_{min}$ and $Y_{min}$ are large, in other words, where the contact area is vertically and horizontally short, the value of L becomes small. Thus obtained L is reflected on the moving speed of the mouse cursor.

By the above-described two processes, it is possible to detect the size of the fingerprint pattern relatively simply. Therefore, it is possible to reduce the processing load of the input device 10 and to respond to the movement of the finger without delay.

Figure 28:
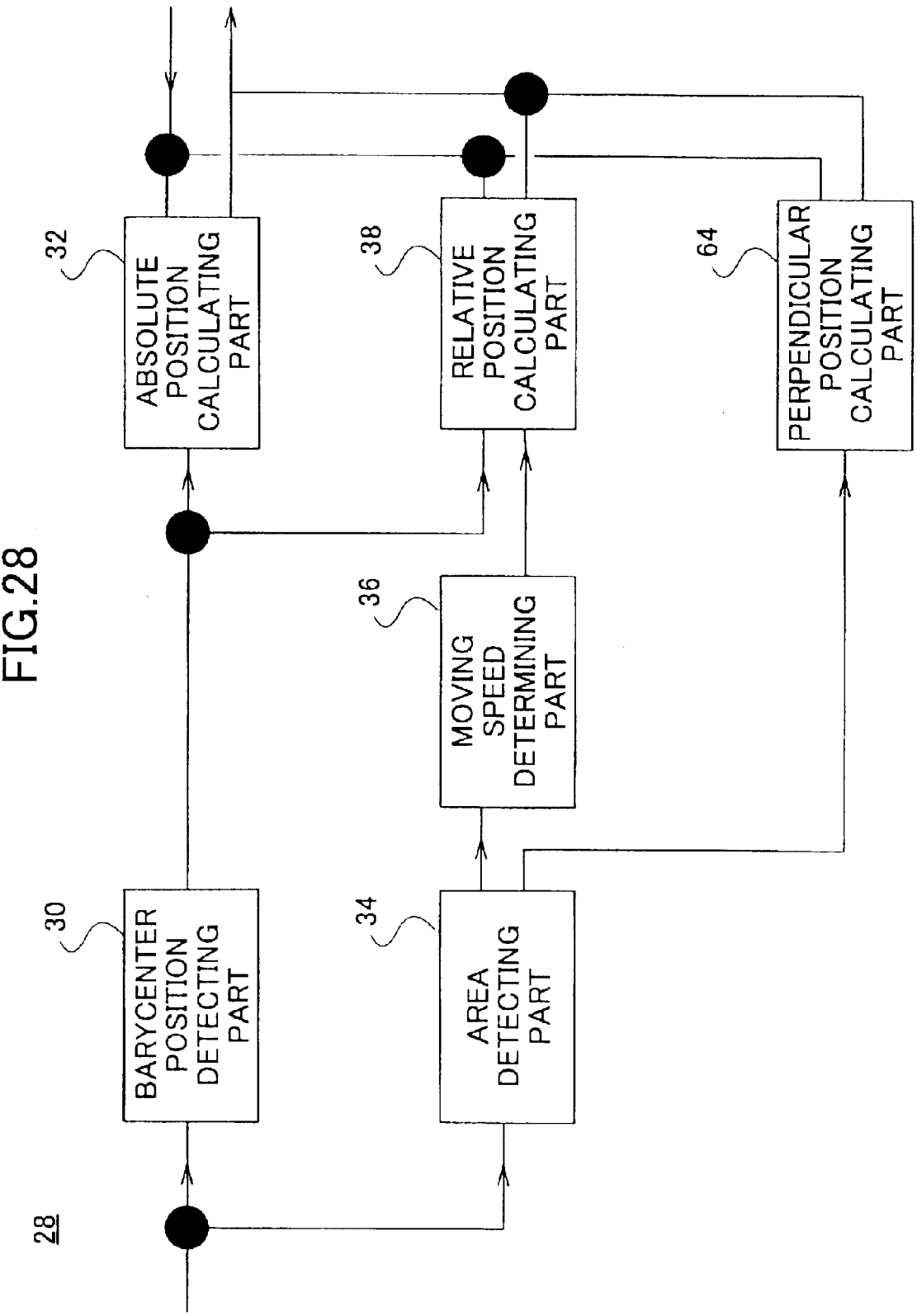
FIG. 28 is a block diagram showing the position/direction detecting part to which a Z-position calculating part (perpendicular position calculating part) is provided.

In addition, by the above-described two detection methods and the method of detecting the area, it is possible to detect the movement in a direction perpendicular to an X-Y surface as well as the movement of the finger in the X-Y direction. Accordingly, by providing a perpendicular position calculating part 64 (FIG. 28) that obtains data from the area detecting part 34 (or the outline detecting part 60 or the XY width detecting part 62) and detects the movement in the perpendicular direction, it is possible to provide an input device having a function as a 3D input device.

For example, in a state where the finger is lightly touching the sensor part 12, when the user presses the finger against the sensor part 12 strongly, the contact area increases. By detecting the area, length, XY width that increase concurrently with the increase of the contact area by the input device 10, it is possible to zoom up a 3-dimension image displayed on the display unit 50, for example.

Figure 29:
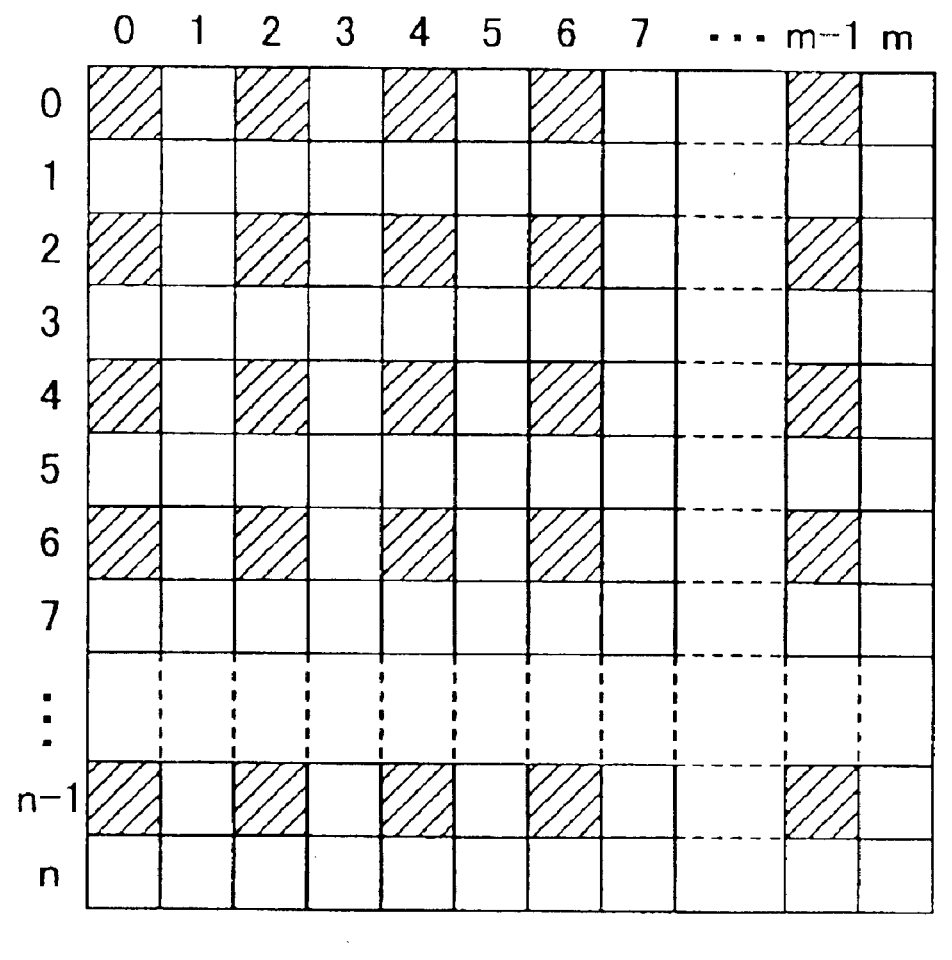
Figure 30:
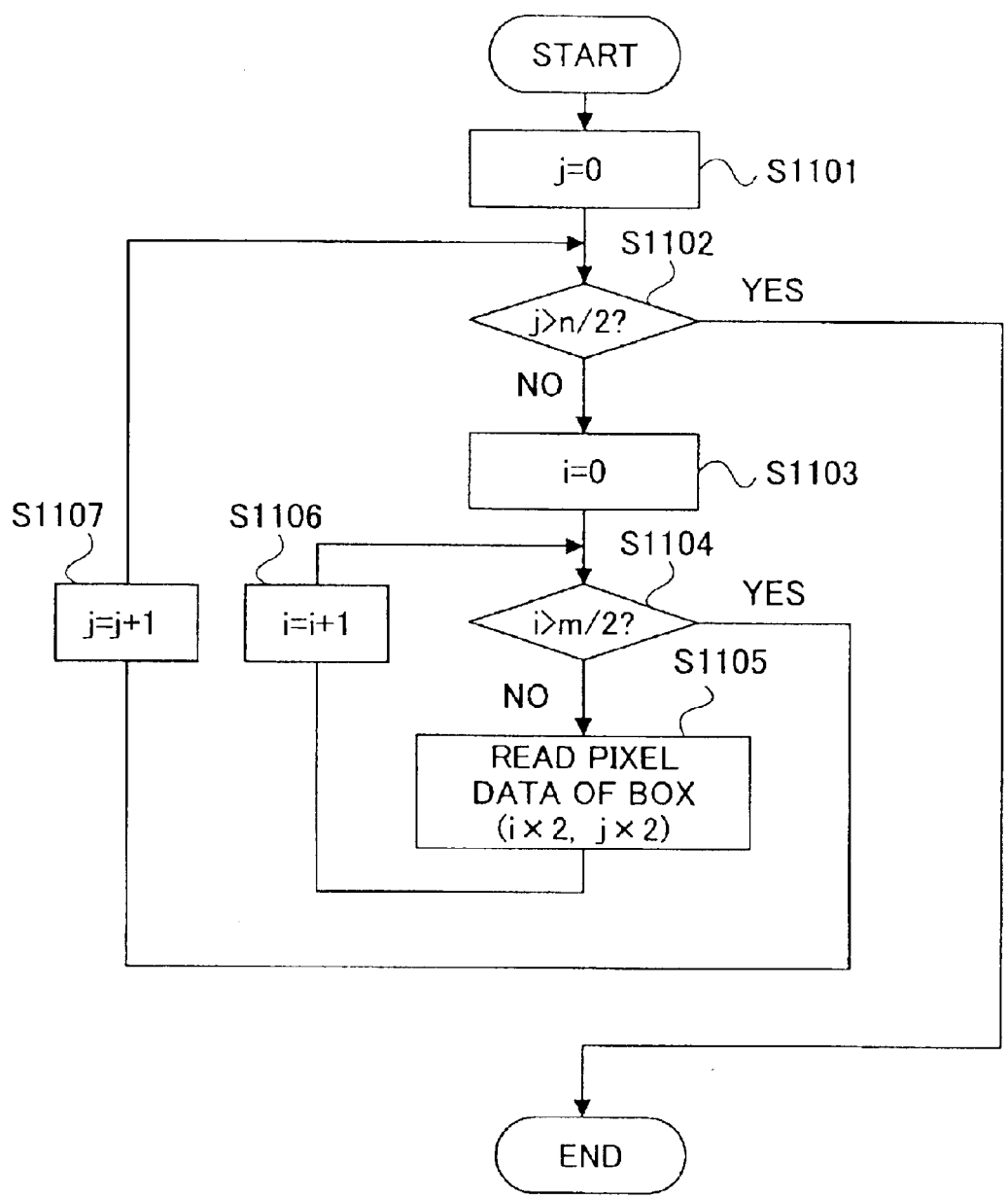
FIG. 30 is a flow chart for explaining a process of data thinning.

Next, a description will be given of the thinning of data and the compression of data, as methods of reducing the processing load and shortening the processing time. FIG. 29 is a diagram showing an example of the thinning of data. In FIG. 29, fingerprint data amount is reduced such that the thinning is performed on every other line (alternately) in the vertical direction and the horizontal direction. In this case, since the data are indicated by hatched parts, the fingerprint data amount is reduced to 25% of the original. Thus, it is possible to reduce the processing load and to shorten the processing time. A description will be given of the process of performing the thinning on every other line, by referring to the flow chart of FIG. 30. The process in step S1101 is initialization of the loop counter j with 0. In step S1102, whether or not j is larger than n/2 is determined. The reason of comparing j with n/2 is that, since the thinning of data is performed on every other line, the number of times of performing reading process of pixel data is reduced to half. As a result of the comparison between j and n/2, in a case where j is larger than n/2 (YES in step S1102), the case indicates that all processes end. Thus, the process of the flow chart of FIG. 30 ends. When j is equal to or less than n/2 (NO in step S1102), the loop counter i is initialized with 0 in step S1103. In the next step S1104, whether or not i is larger than m/2 is determined. The reason of comparing i with m/2 is the same as the reason of step S1102. As a result of the comparison between i and m/2, in a case where i is larger than m/2 (YES in step S1104), the case indicates that a process relating to the "j"th line ends. Accordingly, in step S1107, j is incremented so as to perform a smaller than m/2 (NO in step S1104), in step S1105, the pixel data of the box in the position (i×2, j ×2) are read, and i is incremented in step S1106.

Figure 31:
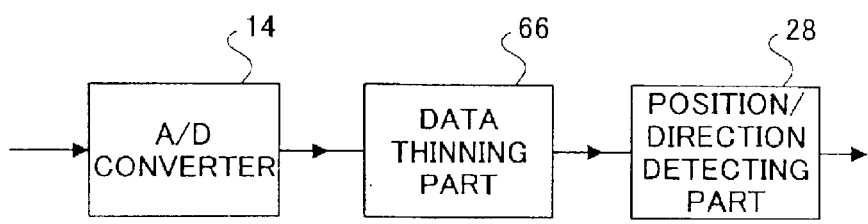
FIG. 31 is a block diagram showing the arrangement position of a data thinning part.

According to the above-described process (flow chart of FIG. 30), it is possible to reduce not only the data amount but also the calculation amount to 25% through a simple calculation. In addition, as shown in FIG. 31, by providing a data thinning part 66 that performs the thinning of data between the A/D converter 14 and the position/direction detecting part 28, outputting the thinned data to the position/direction detecting part 28, and processing the thinned data by the position/direction detecting part 28, it is possible to reduce the processing amount and processing time.

Figure 32:
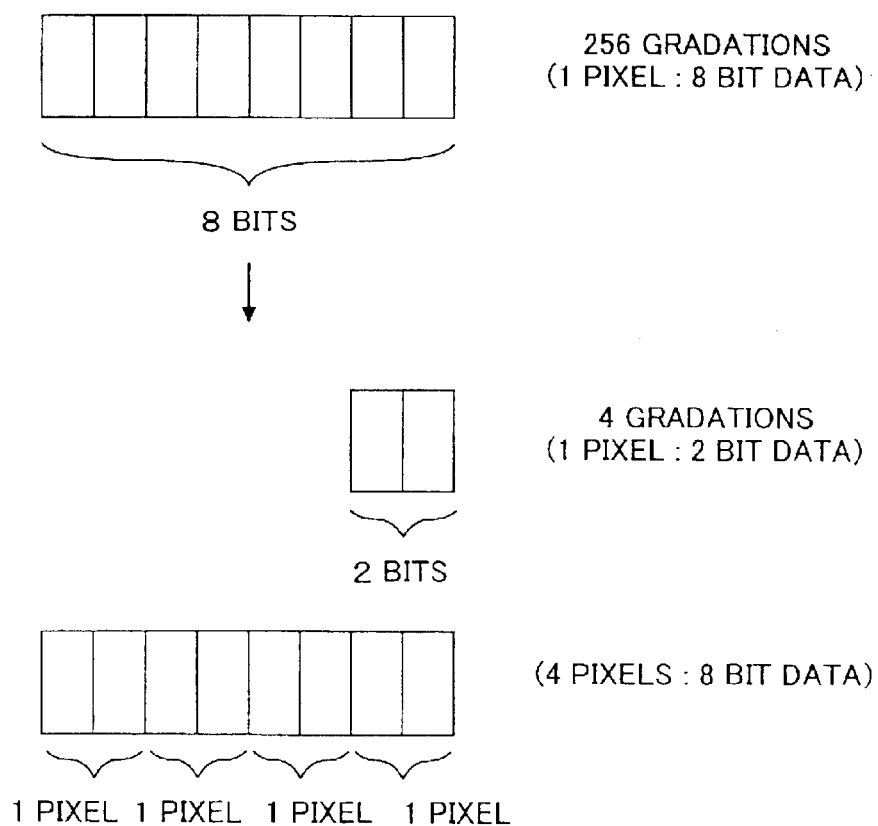
FIG. 32 is an explanatory diagram of a compression method.

Next, a description will be given of the compression. The compression of fingerprint data is performed such that the fingerprint data on which digital conversion is performed by the A/D converter 14 is compressed by using a comparator. For example, as shown in FIG. 32, fingerprint data in which 1 pixel is represented by 256 gradations (8 bits) is compressed to 4 gradations (2 bits) or 2 gradations (1 bit). When 256 gradations are converted to 4 gradations, as shown in FIG. 32, it is possible to represent data for four pixels with data (the bits used) for one pixel in 256 gradations.

Figure 33:
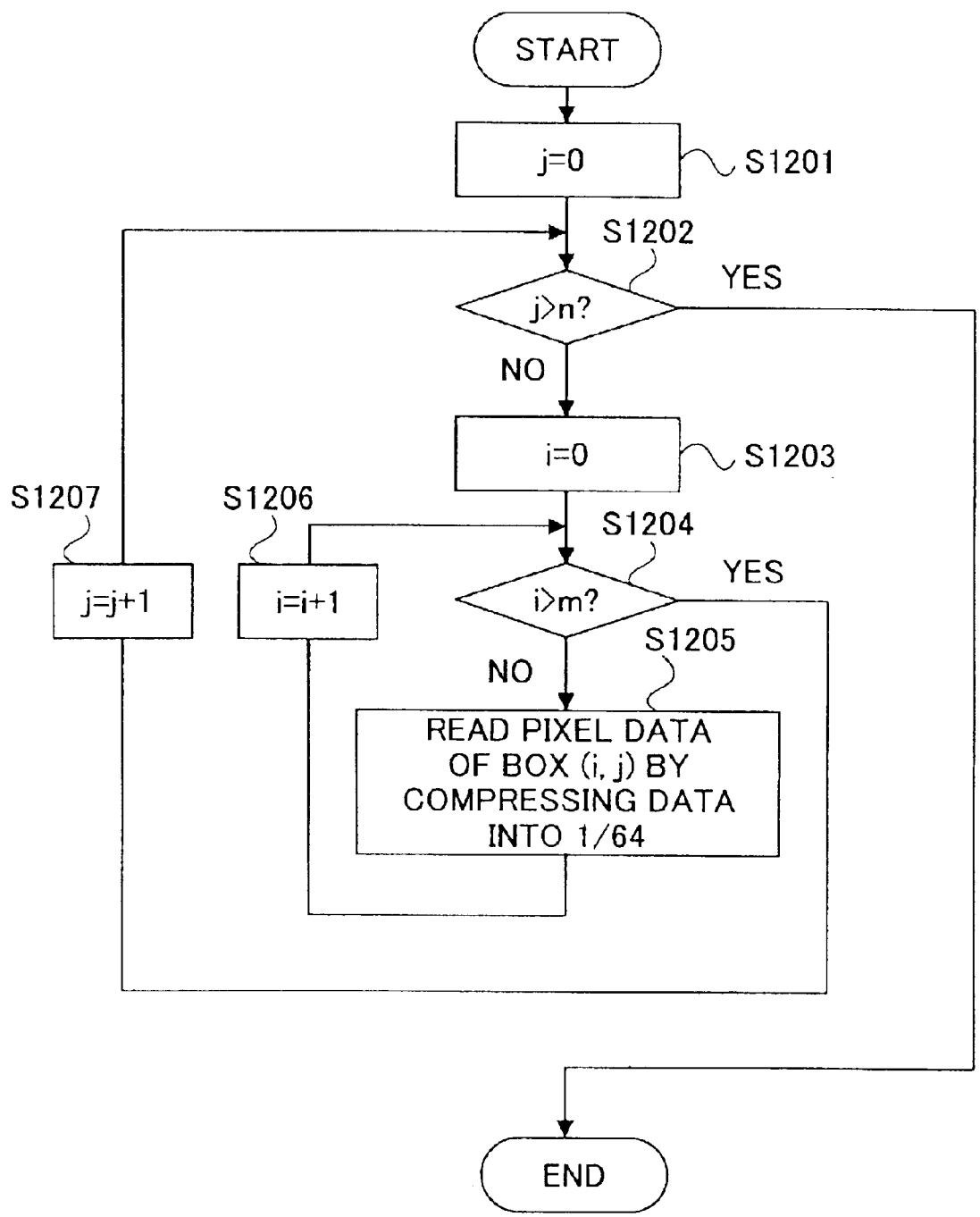
FIG. 33 is a flow chart for explaining a process of compression.

A description will be given of the compression process, with reference to the flow chart of FIG. 33. The process of step S120 is the initialization of the loop counter j with 0. In step S1202, whether or not j is larger than n is determined. As a result of the comparison between j and n, in a case where j is larger than n (YES in step S1202), since the case indicates that all processes end, the process ends. When j is equal to or smaller than n (NO in step S1202), the loop counter i is initialized with 0 in step S1203. In the next step S1204, whether or not i is larger than m is determined. As a result of the comparison between i and m, in a case where i is larger than m (YES in step S1204), the case indicates that the process relating to "j"th boxes ends. Accordingly, in step S1207, j is incremented so as to perform the process of "j+1"th boxes. When i is equal to or smaller than m (NO in step S1204), in step S1205, the pixel data of the box in the position (i, j) is read by compressing the data into 1/64 (256 gradations to 4 gradations). Thereafter, in step S1206, i is incremented.

According to the above-described process (the flow chart of FIG. 33), it is possible to reduce the data amount to 1/64. As shown in FIG. 34, by providing a data compressing part 68 that performs the compression of data between the A/D converter 14 and the position/direction detecting part 28, outputting the compressed data to the position/direction detecting part 28, and processing the compressed data by the position/direction detecting part 28, it is possible to reduce the processing amount and processing time. Further, in addition to the gradation conversion by the comparator, the compression can be realized by other compression methods such as the run-length process.

Additionally, FIG. 35 shows a construction where the above-described data thinning and compression are combined. In FIG. 35, the fingerprint data on which A/D conversion is performed by the A/D converter is thinned by the data thinning part 66 first, further compressed by the data compressing part 68, and output to the position/direction detecting part 28. In this manner, it is possible to further reduce the processing amount and to shorten the processing time compared to a case where either the thinning or the compression is solely performed.

Figure 36:
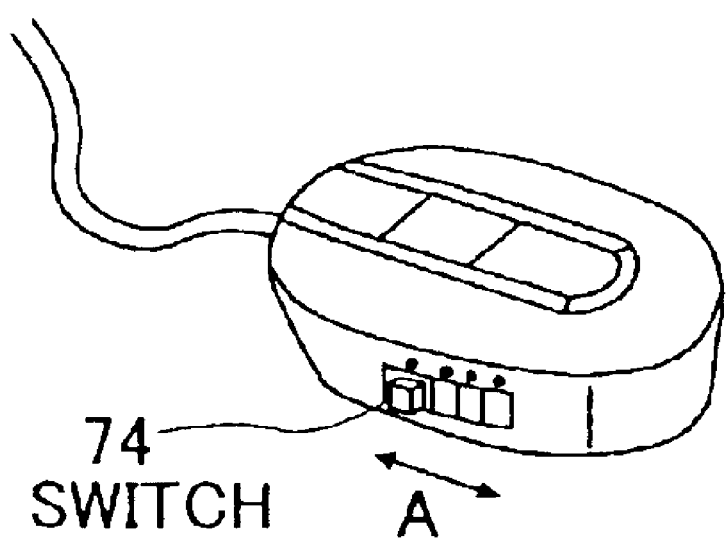
FIG. 36 is a perspective view of the input device to which a switch is provided.
Figure 37:
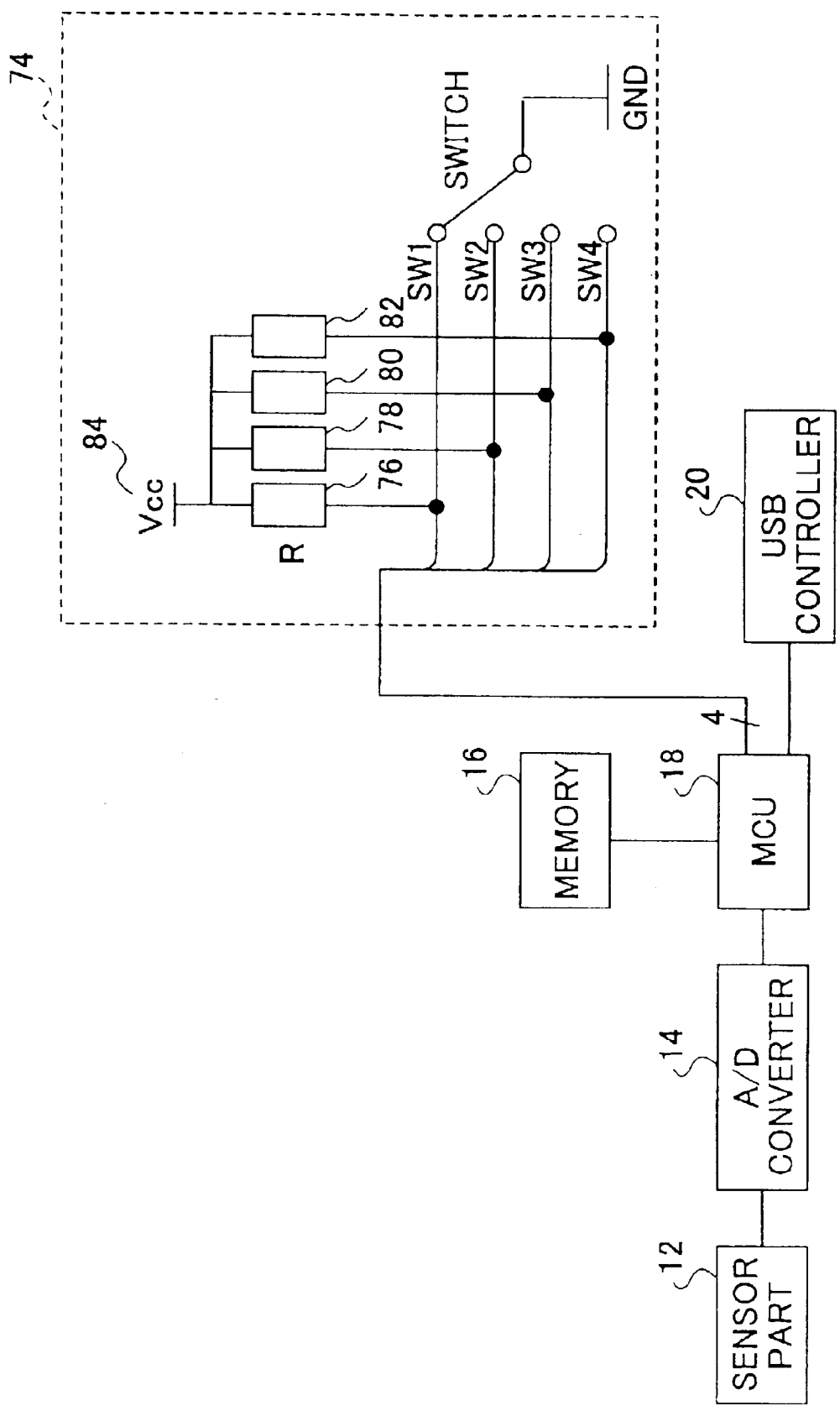
FIG. 37 is a hardware block diagram of the input device to which the switch is provided.

Next, a description will be given of switching of operation modes of the input device 10. There are four kinds of operation modes: an authentication process mode, an absolute position process mode, a relative position process mode, and a Z-position (perpendicular position) process mode. In each of the above-described modes, the part performing the process corresponding to the mode is activated. For example, in the Z-position mode, the perpendicular position calculating part 64 is activated. The switching of the modes is performed in three kinds of ways, that is, a case where a switch is newly provided for the input device 10 and the switching is performed by the switch, a case where the switching is performed by the computer 22, and a case where the switching is performed by the kind of finger authenticated by the sensor part 12. In the case where the switch is provided for the input device 10, as shown in FIG. 36, a switch sliding in four stages is provided on a side surface of the input device 10, for example. The switch 74 slides in the directions indicated by an arrow A in FIG. 36. FIG. 37 is a hardware block diagram of the input device 10 of this case. The block diagram shown in FIG. 37 is obtained by providing a switch 74 to the hardware block diagram of FIG. 4. The switch 74 includes resistances 76, 78, 80 and 82, and a power source 84. The resistance 76 is serially connected to a switch SW1, the resistance 78 is serially connected to a switch SW2, the resistance 80 is serially connected to a switch SW3, and the resistance 82 is serially connected to a switch SW4. In addition, a series circuit including the resistance 76 and the switch SW1, a series circuit including the resistance 78 and the switch SW2, a series circuit including the resistance 80 and the switch SW3, and a series circuit including the resistance 82 and the switch SW4 are each connected between the power source 84 and the ground (GND). In the switch 74 constructed as mentioned above, when the switch SW1, for example, is selected and connected to the ground, the voltage between the switch SW1 and the MCU 18 becomes a low level, and the voltages between the other switches SW2, SW3 and SW4 and the MCU 18 remains high levels. Accordingly, the MCU 18 recognizes which switch is selected and performs the operation mode corresponding to the selected switch. Hence, when the switch is provided to the input device 10, it is possible to select the operation mode by the switch.

Figure 38:
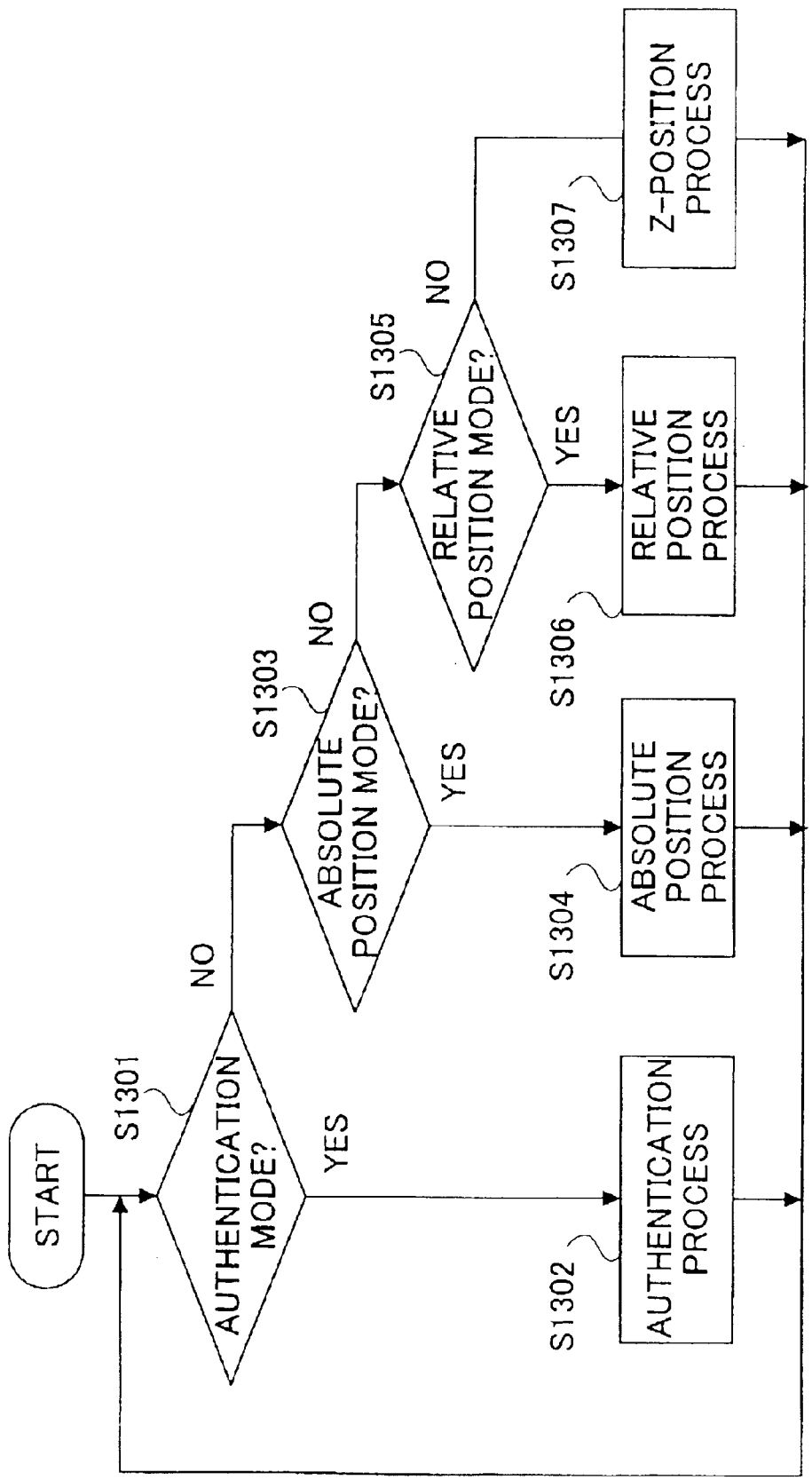
FIG. 38 is a flow chart for explaining a process of determining an operation mode.

Next, in the case where the operation mode is selected by the computer 22, the operation mode is determined by the kinds of the function keys on a keyboard equipped with the computer 22. FIG. 38 shows a flow chart for this case. First, in step S1301, it is determined whether or not the kind of the function key provided from the computer 22 is the authentication process mode. When the kind of the function key corresponding to the authentication process mode is provided (YES in step S1301), an authentication process is performed in step S1302. When the kind of the function key does not correspond to the authentication process mode (NO in step S1301), whether or not the kind of the function key corresponds to the absolute position process mode is determined in step S1303. When the kind of the function key corresponding to the absolute position process mode is provided (YES in step S1303), the absolute position process is performed in step S1304. When the kind of the function key does not correspond to the absolute position process mode (NO in step S1303), in step S1305, it is determined whether or not the kind of the function key corresponds to the relative position process mode. When the kind of the function key corresponding to the relative position process mode is provided (YES in step S1305), the relative position process is performed in step S1306. When the kind of the function key does not correspond to the relative position process mode (NO in step S1305), the Z-position process is performed in step S1307. Hence, it is possible to select the operation mode by the switch or the computer 22.

Figure 39:
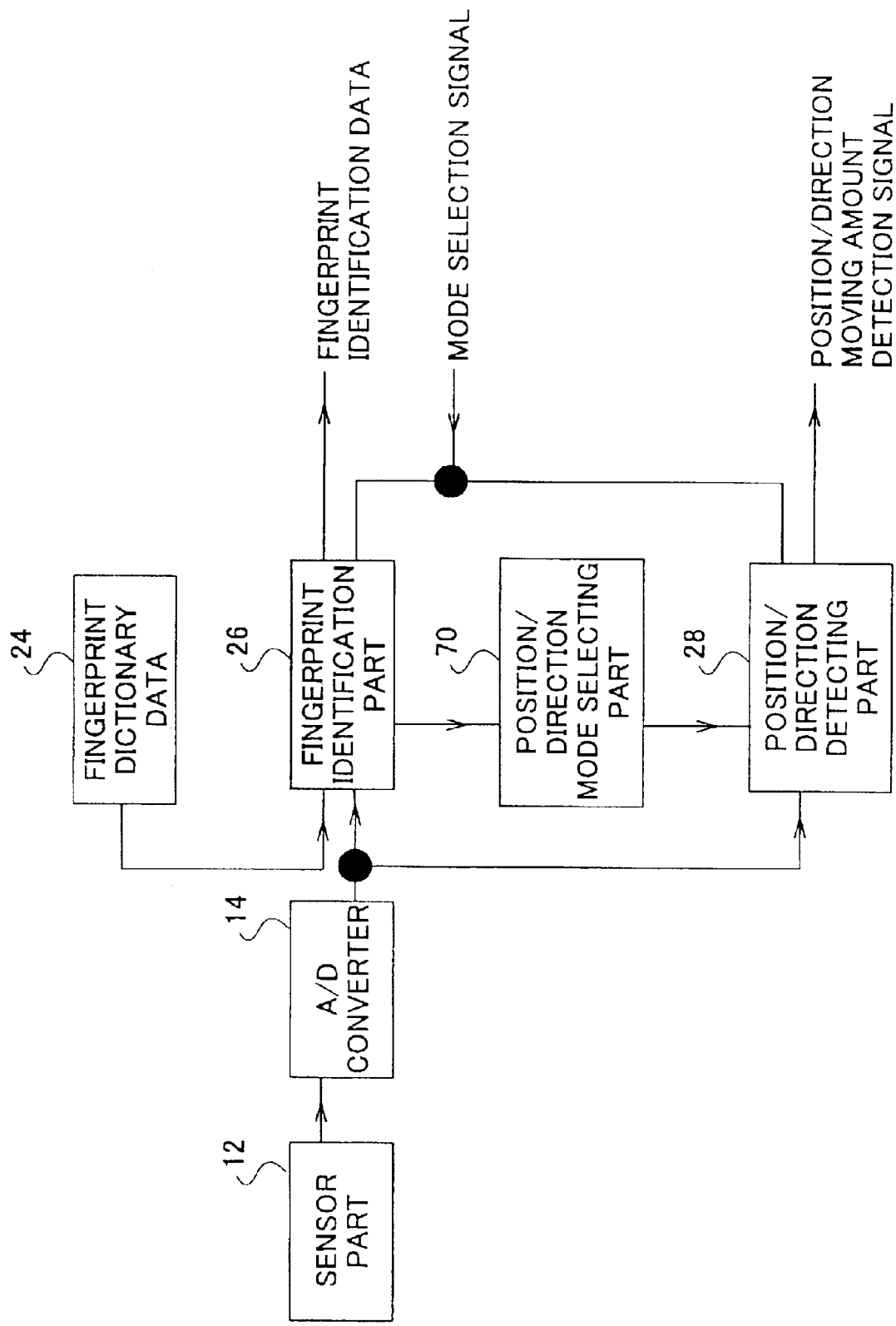
FIG. 39 is a function block diagram of the input device to which a position/direction mode selecting part is provided.

Next, a description will be given of a case where the operation mode is selected according to the, kind of finger authenticated by the sensor part 12. Here, the kind of finger refers to such as the first finger and the thumb. The input device 10 performs the various operation modes by determining the kind of finger using the fact that each finger has a different fingerprint. Thus, in the input device 10 of this case, as shown in FIG. 39, a position/direction mode selecting part 70 that determines the operation mode of the position/direction detecting part 28 is provided between the fingerprint identification part 26 and the position/direction detecting part 28 that are shown in the block diagram of FIG. 5.

Under the above-described construction, the first finger, the second finger and the third finger of the right hand of the user of the input device 10 are input to the fingerprint dictionary data 24 beforehand. Further, each of the fingers corresponds to one of the operation modes. For example, the right first finger corresponds to the absolute position process mode, the right second finger corresponds to the relative position process mode, and the right third finger corresponds to the scroll operation. As mentioned above, by inputting (storing) the fingerprints and the operation modes in the fingerprint dictionary data 24 such that each of the fingerprints corresponds to one of the operation modes, when the user puts the right first finger, for example, on the sensor part 12 and the authentication ends, the position/direction detecting part 28 operates in the absolute position process mode.

As mentioned above, in the case where the operation mode is selected according to the kind of finger authenticated by the sensor part 12, besides the selection of the operation mode, it is possible to add a variation of an independent operation of the input device 10 such as a scroll operation.

The present invention is not limited to the specifically disclosed embodiments, and variations and modifications may be made without departing from the scope of the present invention.

The present application is based on Japanese priority applications No. 2002-030089 filed on Feb. 6, 2002 and No. 2002-234543 filed on Aug. 12, 2002, the entire contents of which are hereby incorporated by reference.

What is claimed is:

1. An input device that transmits, to a host device having a display displaying a pointer, information relating to the pointer and includes a sensor detecting contact information, comprising:
   an area extracting part extracting a contact area of the sensor and a finger based on the contact information detected by the sensor; and
   a control part controlling the pointer based on the contact area extracted by said area extracting part, wherein the control part comprises:
   a first control part detecting a barycenter position or a center position of the contact area extracted by the area extracting part and controlling the pointer based on the detected position, and
   a second control part controlling the pointer based on a value obtained from the contact area extracted by the area extracting part, and wherein the second control part controls a moving speed of the pointer based on a size of the contact area.

2. The input device as claimed in claim 1, further comprising:
   a click detecting part detecting a click based on time in which the contact area is extracted by the area extracting part.

3. The input device as claimed in claim 2, wherein the click detecting part detects a double-click when two clicks are detected in a predetermined interval.

4. The input device as claimed in claim 1, further comprising:
   an information reducing part generating contact area information by reducing the amount of area information obtained by the area extracting part.

5. The input device as claimed in claim 1, further comprising:
   an information compressing part generating contact area information by compressing the amount of area information obtained by the area extracting part.

6. An input device that transmits, to a host device having a display displaying a pointer, information relating to the pointer and includes a sensor detecting contact information, comprising:
   an area extracting part extracting a contact area of the sensor and a finger based on the contact information detected by the sensor; and
   a control part controlling the pointer based on the contact area extracted by said area extracting part, wherein the control part comprises:
   a first control part detecting a barycenter position or a center position of the contact area extracted by the area extracting part and controlling the pointer based on the detected position, and
   a second control part controlling the pointer based on a value obtained from the contact area extracted by the area extracting part, and wherein the second control part controls a moving speed of the pointer based on a length of an outline of the contact area.

7. An input device that transmits, to a host device having a display displaying a pointer, information relating to the pointer and includes a sensor detecting contact information, comprising:

an area extracting part extracting a contact area of the sensor and a finger based on the contact information detected by the sensor; and a control part controlling the pointer based on the contact area extracted by said area extracting part, wherein the control part comprises:

a first control part detecting a barycenter position or a center position of the contact area extracted by the area extracting part and controlling the pointer based on the detected position, and a second control part controlling the pointer based on a value obtained from the contact area extracted by the area extracting part, and wherein the second control part controls a moving speed of the pointer based on lengths of sides of a rectangle circumscribing the contact area.

8. An input device that transmits, to a host device having a display displaying a pointer, information relating to the pointer and includes a sensor detecting contact information, comprising:

an area extracting part extracting a contact area of the sensor and a finger based on the contact information detected by the sensor;

a control part controlling the pointer based on the contact area extracted by said area extracting part, wherein the control part comprises:

a first control part detecting a barycenter position or a center position of the contact area extracted by the area extracting part and controlling the pointer based on the detected position, and a second control part controlling the pointer based on a value obtained from the contact area extracted by the area extracting part; and a click detecting part detecting a click based on the value obtained by the second control part.

9. An input device that transmits, to a host device having a display displaying a pointer, information relating to the pointer and includes a sensor detecting contact information, comprising:

an area extracting part extracting a contact area of the sensor and a finger based on the contact information detected by the sensor;

a control part controlling the pointer based on the contact area extracted by said area extracting part, wherein the control part comprises:

a first control part detecting a barycenter position or a center position of the contact area extracted by the area extracting part and controlling the pointer based on the detected position, and a second control part controlling the pointer based on a value obtained from the contact area extracted by the area extracting part;

a perpendicular position detecting part detecting a position of the finger in a direction almost perpendicular to the sensor according to a value obtained from the contact area;

fingerprint dictionary information recording fingerprint information beforehand;

a fingerprint information identification part identifying information read by the sensor using said fingerprint dictionary information; end a switching part selecting one of plural operation modes, wherein the plural operation modes comprise:

a first operation mode in which the first control part is activated, a second operation mode in which the first and second control parts are activated, a third operation mode in which the fingerprint information identification part is activated; and a fourth operation mode in which the perpendicular position detecting part is activated.

10. The input device as claimed in claim 9, wherein the operation modes are switched based on an identification result by the fingerprint information identification part.

11. A pointer control method of controlling a pointer displayed on a display of a host device based on contact information detected by a sensor, comprising:

displaying a pointer and information relating to the pointer;

detecting contact information by a sensor;

extracting a contact area of the sensor and a finger, based on the contact information detected by the sensor; and controlling the pointer based on the extracted contact area, wherein the controlling comprises:

detecting a barycenter position or a center position of the extracted contact area, and controlling the pointer based on a value obtained from the contact area extracted by the area extracting part.

12. An input device that transmits, to a host device having a display displaying a pointer, information relating to the pointer and includes a sensor detecting contact information, comprising:

a fingerprint authentication part authenticating a fingerprint of a finger touching the sensor;

an area detecting part detecting the size of a contact area of the sensor and the finger based on the contact information detected by the sensor; and a control part controlling a moving speed of the pointer based on the fingerprint authenticated by said fingerprint authentication part and the size of the contact area detected by said area detecting part.

13. The input device as claimed in claim 12, wherein the control part sets a speed parameter used as a moving speed of the pointer and stored such that the speed parameter corresponds to the fingerprint based on the fingerprint authenticated by the fingerprint authentication part, and controls the moving speed of the pointer based on the speed parameter and the size detected by the area detecting part.

14. The input device as claimed in claim 12, wherein:

when the size detected by the area detecting part is equal to or less than a first area, the control part moves the pointer at a lowest speed;

when the size detected by the area detecting part is equal to or larger than a second area, the control part moves the pointer at a highest speed; and when the size detected by the area detecting part is larger than the first area and smaller than the second area, the control part moves the pointer at an intermediate speed faster than the lowest speed and slower than the highest speed based on the detected area.

* * * * *

UNITED STATES PATENT AND TRADEMARK OFFICE
CERTIFICATE OF CORRECTION

| | |
|---|---|
| PATENT NO. | : 6,937,226 B2 |
| APPLICATION NO. | : 10/307958 |
| DATED | : August 30, 2005 |
| INVENTOR(S) | : Satoshi Sakurai et al. |

It is certified that error appears in the above-identified patent and that said Letters Patent is hereby corrected as shown below:

Column 21, Line 61, after "identifying" insert -- fingerprint --.
Column 21, Line 63, delete "end" and insert -- and -- therefor.
Column 22, Line 15, after "device" insert -- , --.
Column 22, Line 28, delete "." and insert -- , wherein a moving speed of the pointer is controlled based on a size of the contact area. -- therefor.

Signed and Sealed this

Twenty-fourth Day of March, 2009

JOHN DOLL
*Acting Director of the United States Patent and Trademark Office*